US009055538B2

(12) United States Patent
Yamazaki et al.

(10) Patent No.: US 9,055,538 B2
(45) Date of Patent: Jun. 9, 2015

(54) RADIO CONTROL APPARATUS, SECOND TRANSMISSION STATION TRANSMISSION POWER DETERMINATION METHOD AND PROGRAM

(75) Inventors: Kenichirou Yamazaki, Tokyo (JP); Hiroto Sugahara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 261 days.

(21) Appl. No.: 13/699,381

(22) PCT Filed: Jun. 15, 2011

(86) PCT No.: PCT/JP2011/003409
§ 371 (c)(1),
(2), (4) Date: Dec. 26, 2012

(87) PCT Pub. No.: WO2011/158502
PCT Pub. Date: Dec. 22, 2011

(65) Prior Publication Data
US 2013/0102319 A1 Apr. 25, 2013

(30) Foreign Application Priority Data

Jun. 18, 2010 (JP) ................................. 2001-139144

(51) Int. Cl.
*H04W 52/24* (2009.01)
*H04W 28/04* (2009.01)
*H04W 52/14* (2009.01)
*H04W 52/40* (2009.01)

(52) U.S. Cl.
CPC ............ *H04W 52/243* (2013.01); *H04W 28/04* (2013.01); *H04W 52/143* (2013.01); *H04W 52/40* (2013.01)

(58) Field of Classification Search
CPC .... H04W 52/18; H04W 52/243; H04W 28/04

USPC .......... 455/63.1, 450, 452.1, 452.2, 453, 454, 455/522

See application file for complete search history.

(56) References Cited

U.S. PATENT DOCUMENTS 6,985,737 B2 * 1/2006 Yamaguchi et al. .......... 455/450
8,774,014 B2 * 7/2014 Seo et al. ..................... 370/246
(Continued)

FOREIGN PATENT DOCUMENTS

JP   2006-135673 A   5/2006
JP   2008-205869 A   9/2008
(Continued)

OTHER PUBLICATIONS

Cha-Sik Leem, et al., "The Spectral Efficiency analysis of the Spectrum Overlay technology of the TV band", International Conference on Cognitive Radio Oriented Wireless Networks and Communications (CrownCom), May 2008, p. 1-5.

*Primary Examiner* — Diane Mizrahi
(74) *Attorney, Agent, or Firm* — Sughrue Mion, PLLC

(57) ABSTRACT

Transmission power of each base station of a secondary system is determined in such away that a transmission capacity of the secondary system is increased as much as possible while interference with a first radio system (primary system) is suppressed by properly controlling the transmission power of a plurality of second transmission stations. A second transmission station transmission power determination means is provided, which determines the transmission power used in each of the second transmission stations based on a first condition that satisfies an allowable value in relation to a system interference amount as an interference amount given to a first reception station as a predetermined reception station of the first radio system by all of the plurality of second transmission stations as transmission stations of a second radio system using a frequency band allocated to the first radio system or a frequency band allowed to be preferentially used.

16 Claims, 10 Drawing Sheets

(56) References Cited

U.S. PATENT DOCUMENTS

2003/0045282 A1* 3/2003 Yamaguchi et al. .......... 455/424
2008/0200178 A1 8/2008 Hamabe

FOREIGN PATENT DOCUMENTS

| JP | 2008-289056 A | 11/2008 |
| JP | 2010-050935 A | 3/2010 |

* cited by examiner ered Wireless Networks and Communications (Crown-Com), May, 2008, p. 1-5

RADIO CONTROL APPARATUS, SECOND TRANSMISSION STATION TRANSMISSION POWER DETERMINATION METHOD AND PROGRAM

CROSS REFERENCE TO RELATED APPLICATIONS

This application is a National Stage of International Application No. PCT/JP2011/003409 filed Jun. 15, 2011, claiming priority based on Japanese Patent Application No. 2010-139144 filed Jun. 18, 2010, the contents of all of which are incorporated herein by reference in their entirety.

TECHNICAL FIELD

The present invention relates to a radio system in which a frequency is shared among different systems, and especially relates to a radio control apparatus, a radio system, a second transmission station transmission power determination method, and a second transmission station transmission power determination program that controls transmission power of a plurality of second transmission stations as transmission stations of a secondary system.

BACKGROUND ART

Generally, there is a limit to a frequency resource in radio communication. Therefore, it is necessary to have a technology that enhances effective use of a frequency. To effectively use the frequency, various studies have been made regarding a technology that enhances a transmission speed per 1 Hz such as multilevel modulation and an error correction code, a cellular system using a method of frequency reuse per cell, a CDMA communication system using one cell reuse, an interference canceller, and the like.

Meanwhile, in recent years, a concept of "cognitive radio" has attracted a lot of attention, in which a free frequency band, a radio wave of which has not been used, is used to perform radio communication. Such a cognitive radio method has a mechanism in which a radio base station itself searches for a currently free frequency band around the radio base station from among all of the frequency bands to be used, and uses the frequency for communication. For example, when there is a frequency band that is not currently used in each radio system according to a period of time and land area, it becomes possible to use this frequency band in the radio base station in the radio communication. In this way, according to the cognitive radio method, the effective use of a frequency can be expected.

The radio base station estimates a frequency band, a radio wave of which has not been used, by a radio terminal that exists in its own radio base station or in a coverage area covered by its own radio base station and acquires information of a frequency band that has not been used by a primary system, and performs the communication using the frequency band. At this time, it is required to use a free frequency band not to deteriorate receiving quality of other radio system by interfering the other radio systems to which a targeted frequency band is allocated or preferential use of the targeted frequency band is allowed.

For example, when a radio wave is transmitted by predetermined transmission power, it is necessary to use the radio wave at a place sufficiently away from other radio system. Also, for example, when the radio wave is used at a place not sufficiently away from other radio system, it is necessary to keep the transmission power low.

In such a technology using the frequency band, the radio wave of which has not been used, Non Patent Literature 1 discloses, for example, a study and an evaluation result of a case where the free frequency is used by all base stations with the same transmission power. To be more specific, it is assumed to have terrestrial digital broadcasting as a primary system of high priority and a wireless regional area networks (WRAN) as a secondary system of low priority. At this time, Non Patent Literature 1 discloses a result of evaluating frequency use efficiency and coverage efficiency of a case using a model in which a plurality of base stations of a secondary system uses a free frequency band of the primary system and a distance between the secondary base stations and a range of evaluation areas are used as parameters.

Also, in relation to a transmission power control method in a radio base station, for example, Patent Literature 1 discloses a method of determining transmission power of the radio base station based on an interference amount in the radio base station.

CITATION LIST

Patent Literature

PLT 1: JP 2006-135673 A

Non Patent Literature

NPL 1: Cha-sik Leem, Jaiyong Lee, Sangwon Kim, Changjoo Kim, and Sung-chul Kang, "The Spectral Efficiency analysis of the Spectrum Overlay technology of the TV band", International Conference on Cognitive Radio Oriented Wireless Networks and Communications (CrownCom), May, 2008, p. 1-5

SUMMARY OF INVENTION

Technical Problem

However, the transmission power control method disclosed in Patent Literature 1 determines the transmission power of its own radio base station based on the interference amount in the own radio base station. That is, a base station having the interference amount to be evaluated and a base station having the transmission power to be determined are the same base station. Therefore, proper transmission power cannot be set if this method is applied to the radio system in which a frequency is shared by difference systems that is considered by the present invention.

Note that Non Patent Literature 1 discusses a method of controlling transmission power of a base station of a secondary system in a radio system in which a frequency is shared by different systems. However, as disclosed in Non Patent Literature 1, the following problem may rise when the transmission power is equalized among all of the base stations of the secondary system. For example, when the transmission power is equalized among all of the base stations of the secondary system, the problem is caused such that a transmission capacity is not necessarily increased in the entire secondary system even in an allowable range. In the method disclosed in Non Patent Literature 1, for example, the transmission power of all of the secondary base stations is kept low when one of a plurality of base stations of the secondary system exist in the vicinity of a primary system in order to suppress the interference given by this base station. As a result, the transmission capacity of the secondary system is not increased.

The present invention has been made in view of the foregoing, and an exemplary object of the present invention is to suppress the interference with a first radio system (primary system) and to maximize the transmission capacity of a secondary system by properly controlling the transmission power of a plurality of second transmission stations such as base stations of the secondary system.

Solution to Problem

A radio control apparatus according to the present invention determines transmission power used in a plurality of second transmission stations as transmission stations of a second radio system using a frequency band allocated to a first radio system or a frequency band allowed to be preferentially used, and the radio control apparatus includes a second transmission station transmission power determination means configured to determine the transmission power used in each of the second transmission stations based on a first condition satisfying an allowable value in relation to a system interference amount as an interference amount given to a first reception station as a predetermined reception station of the first radio system by all of the second transmission stations.

Further, a radio system according to the present invention uses a frequency band allocated to a first radio system or a frequency band allowed to be preferentially used, and the radio system includes a second transmission station transmission power determination means configured to determine transmission power used in each of transmission stations based on a first condition satisfying an allowable value in relation to a system interference amount as an interference amount given to a first reception station as a predetermined reception station of the first radio system by all of the transmission stations requiring secondary use of the frequency band in the radio system.

Further, a second transmission station transmission power determination method according to the present invention is a method for determining transmission power used in a plurality of second transmission stations of a second radio system using a frequency band allocated to a first radio system or a frequency band allowed to be preferentially used, and the method includes determining the transmission power used in each of the second transmission stations based on a first condition satisfying an allowable value of a system interference amount as an interference amount given to a first reception station as a predetermined reception station of the first radio system by all of the second transmission stations.

Further, a second transmission station transmission power determination program according to the present invention is a program for determining transmission power used in a plurality of second transmission stations of a second radio system using a frequency band allocated to a first radio system or a frequency band allowed to be preferentially used, and the program causes a computer to execute determining the transmission power used in each of the second transmission stations based on a first condition satisfying an allowable value of a system interference amount as an interference amount given to a first reception station as a predetermined reception station of the first radio system by all of the second transmission stations.

Advantageous Effects of Invention

According to the present invention, the interference caused with a first radio system (primary system) can be suppressed while the transmission capacity of a secondary system can be further increased by properly controlling the transmission power of a plurality of second transmission stations.

DESCRIPTION OF EMBODIMENTS

Exemplary Embodiment 1

Hereinafter, a first exemplary embodiment according to the present invention will be described. The present exemplary embodiment employs a transmission power determination method of a secondary base station for maximizing a transmission capacity or approximating the transmission capacity to a maximum value while satisfying an allowable value of an interference amount given to a reception station of a primary system. Further, a maximum value/minimum value of the transmission power of the secondary base station is also added to a condition, and the transmission power of the secondary base station is determined.

Figure 1:
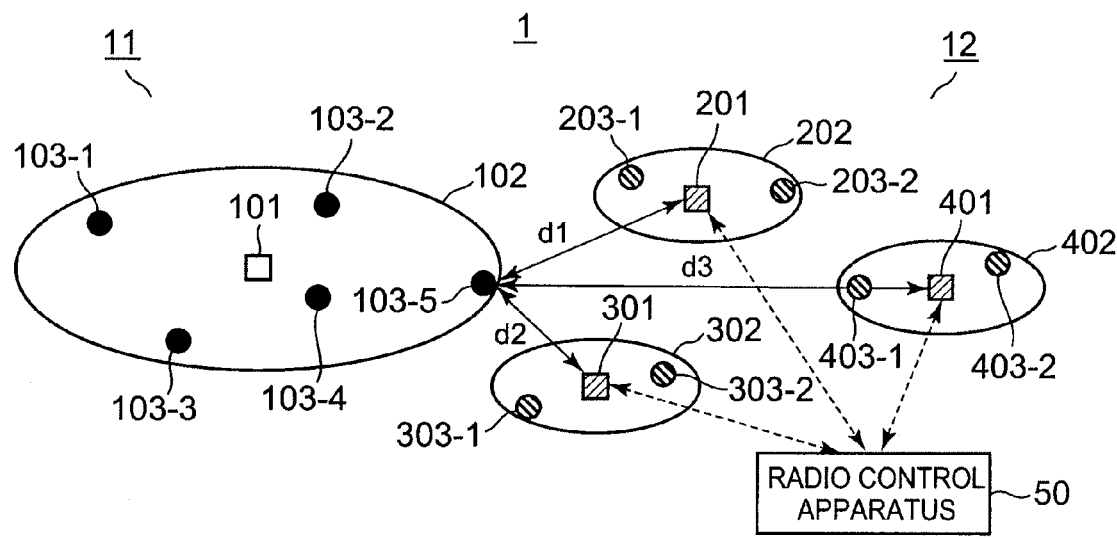
FIG. 1 It depicts a system configuration diagram illustrating an example of a radio system according to the present invention.

FIG. 1 is a system configuration diagram illustrating a radio system 1 that includes an example of a radio control apparatus 50 according to the present invention, a first radio system 11, and a second radio system 12. In the present invention, the first radio system 11 is described as a primary system, and the second radio system 12 is described as a secondary system.

Figure 2:
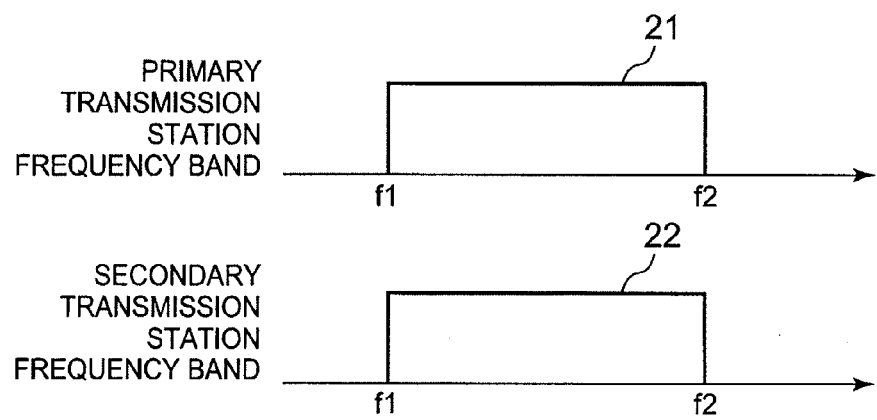
FIG. 2 It depicts a frequency configuration diagram illustrating an example of a system band according to a first exemplary embodiment.

The primary system 11 includes a base station 101. Also, as a system band, for example, a frequency band 21 illustrated in FIG. 2 is allocated (or, preferential use of the frequency band 21 is allowed).

Further, the primary system 11 includes a terminal station 103 in an area (coverage area) 102 where communication or broadcasting with the base station 101 is possible. Note that FIG. 1 illustrates five terminal stations 103 (terminal stations 103-1 to 103-5) in the coverage area 102 of the base station 101. However, the number of the terminal stations 103 is not limited.

Meanwhile, the secondary system 12 includes a base station 201, a base station 301, and a base station 401 in the example illustrated in FIG. 1. The base station 201 is arranged such that a coverage area 202 is located somewhere around or overlaps with the coverage area 102 of the base station 101 of the primary system 11. Also, it is assumed that one or more terminal stations 203 exist in the coverage area 202 of the base station 201.

Similarly, the base stations 301 and 401 are arranged such that respective coverage areas 302 and 402 are located somewhere around or overlap with the coverage area 102 of the base station 101 of the primary system 11. Also, it is assumed that one or more terminal stations 303 and one or more terminal stations 403 respectively exist in the coverage areas 302 and 402 of the base stations 301 and 401.

Note that FIG. 1 illustrates an example where the terminal stations 203-1 and 203-2 exist in the coverage area 202 of the base station 201, the terminal stations 303-1 and 303-2 exist in the coverage area 302 of the base station 301, and the terminal stations 403-1 and 403-2 exist in the coverage area 402 of the base station 401. Note that the number of the terminal stations 203, 303, and 403 is not limited.

Here, the secondary system 12 uses a frequency band 22 by being spatially away from the primary system 11. The frequency band 22 is the same as the frequency band 21 that is allocated as a system band to the primary system 11 or the preferential use thereof being allowed, as illustrated in FIG. 2, for example.

Figure 3:
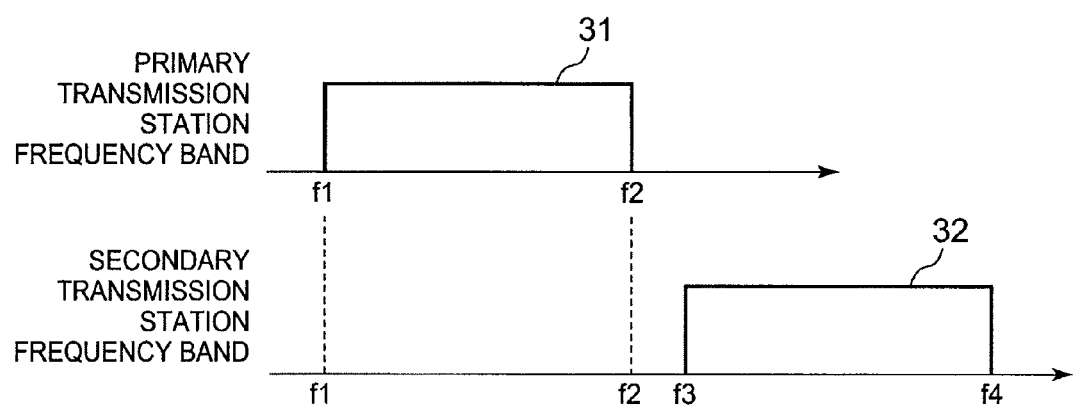
FIG. 3 It depicts a frequency configuration diagram illustrating another example of the system band according to the first exemplary embodiment.

Further, when a frequency band 31 as illustrated in FIG. 3 for example is allocated to the primary system 11 as the system band or the primary system 11 is allowed to preferentially use the frequency band 31, the secondary system 12 may use a frequency band 32 adjacent to the frequency band 31.

In such a system model, the radio control apparatus 50 determines the transmission power of the secondary system 12 in such a way that an interference signal that reaches the primary system 11 from the secondary system 12 does not affect the receiving quality of the reception station of the primary system. Here, an exemplary embodiment is assumed in which the frequency band 21 illustrated in FIG. 2 or the frequency band 31 illustrated in FIG. 3 is used in a down link of the primary system, and the frequency band 22 illustrated in FIG. 2 or the frequency band 32 illustrated in FIG. 3 is used in a down link of the secondary system. Therefore, the primary terminal stations 103-1 to 103-5 in the coverage area 102 of the base station 101 of the primary system serve as reception stations of the primary system. Also, the base stations 201, 301, and 401 of the secondary system serve as transmission stations of the secondary system.

Figure 4:
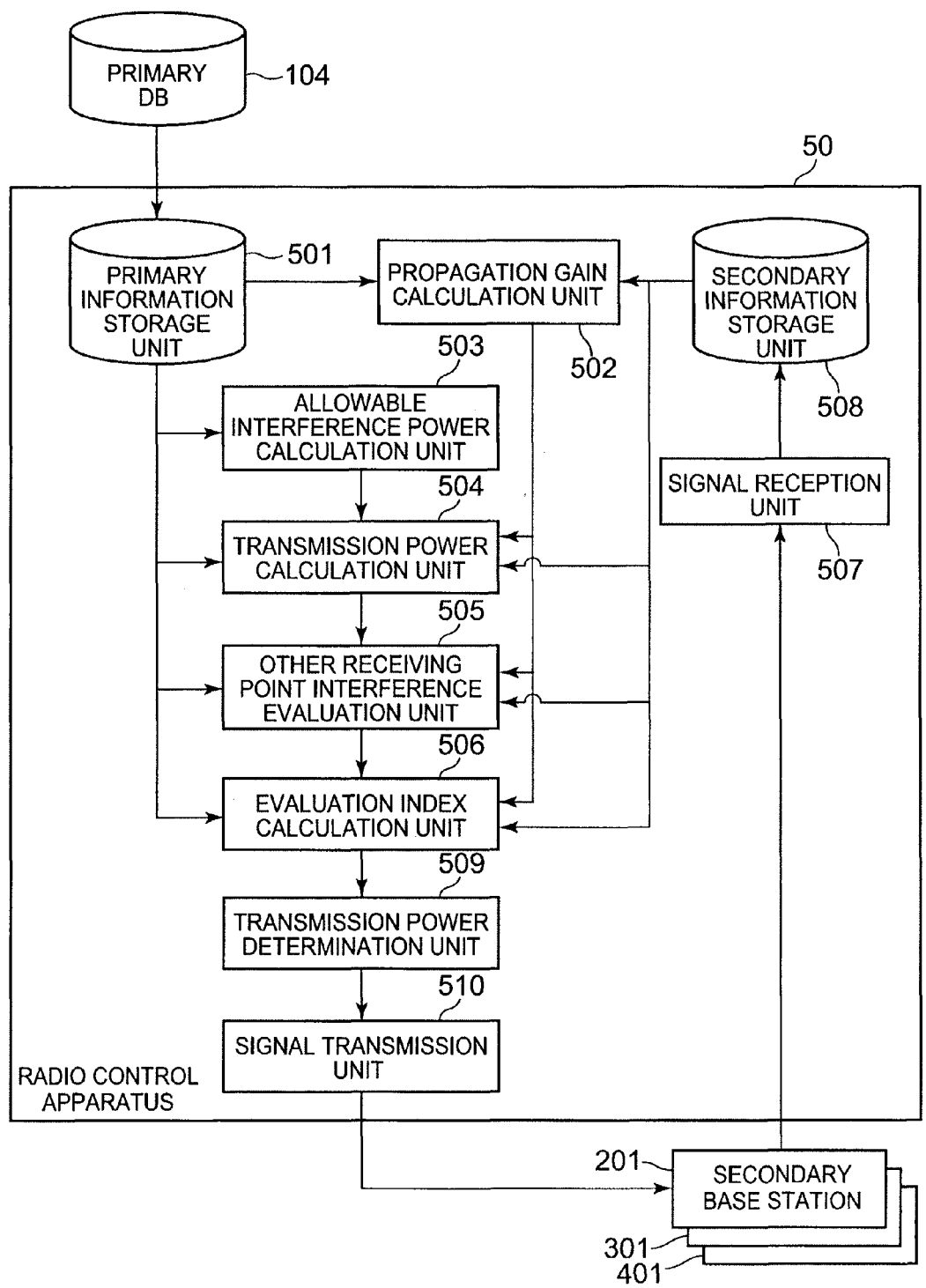
FIG. 4 It depicts a block diagram illustrating a configuration example of a radio control apparatus of the first exemplary embodiment.

FIG. 4 is a block diagram illustrating a configuration example of the radio control apparatus 50. The radio control apparatus 50 includes a primary information storage unit 501, a propagation gain calculation unit 502, an allowable interference power calculation unit 503, a transmission power calculation unit 504, an other receiving point interference evaluation unit 505, an evaluation index calculation unit 506, a signal reception unit 507, a secondary information storage unit 508, a transmission power determination unit 509, and a signal transmission unit 510.

The primary information storage unit 501 acquires information of the primary system (hereinafter, referred to as primary information) from a primary DB (DataBase) 104 in which the primary information is stored and stores the acquired primary information. The primary information is, for example, information of frequency used by the primary base station, coverage area information, positional information, transmission power information, transmission antenna height information, transmission antenna directional characteristic information, positional information of the primary terminal station, reception antenna height information, reception antenna directional characteristic information, surrounding geographical and planimetric feature information, allowable signal to interference ratio (SIR, signal-to-interference power ratio) information, and the like.

Note that the primary information stored in the primary information storage unit 501 is referenced by the propagation gain calculation unit 502, the allowable interference power calculation unit 503, the transmission power calculation unit 504, the other receiving point interference evaluation unit 505, and the evaluation index calculation unit 506. The radio control apparatus 50 (to be more specific, the primary information storage unit 501) and the primary DB 104 may be connected with a wire or may be configured to wirelessly acquire the primary information. Note that the radio control apparatus 50 may be configured to include the primary DB 104 itself instead of the primary information storage unit 501.

The signal reception unit 507 receives secondary information from each of the secondary base stations 201, 301, and 401 and outputs the information to (stores the information in) the secondary information storage unit 508. The secondary information is information of the secondary system and, for example, includes information of frequency used by the secondary base station, coverage area information, positional information, allowable maximum transmission power value information, necessary minimum transmission power value information, transmission antenna height information, transmission antenna directional characteristic information, surrounding geographical and planimetric feature information, and the like. Further, the secondary information may include positional information of the secondary terminal station to which traffic is occurring, reception antenna height information, reception antenna directional characteristic information, radio resource allocation information, and the like. Note that the radio control apparatus 50 (to be more specific, the signal reception unit 507) and each of the secondary base stations 201, 301, and 401 are connected with a wire or may be configured to wirelessly acquire the secondary information. When information is wirelessly exchanged with (collected from and notified to) each of the base stations of the secondary system, the radio control apparatus 50 is configured to include a transmission antenna and a reception antenna.

Here, an allowable maximum transmission power value and a necessary minimum transmission power value of the secondary base station included in the secondary information may be defined from a functional aspect of a power amplifier and the like that constitute the secondary base station. Also, these values may be properly changed based on current traffic or traffic anticipated in the future in the secondary base station or the positional information of the secondary terminal station in which the traffic is occurring and the like. For example, regarding a traffic amount of each of the secondary base stations, a threshold value for defining the allowable maximum transmission power value is determined in advance, and when the current traffic or the traffic anticipated in the future is larger than a predetermined threshold, a maximum value defined from a functional aspect may be determined to the allowable maximum transmission power value. Meanwhile, when the current traffic or the traffic anticipated in the future is smaller than the predetermined threshold, for example, a lower value than the maximum value defined from the functional aspect may be determined to be the allowable maximum transmission power value. Further, when the position of the secondary terminal station in which the traffic is occurring is in the vicinity of the secondary base station (for example, at a distance within a predetermined threshold value), for example, a lower value than the maximum value defined from the functional aspect may be determined to be the allowable maximum transmission power value.

Note that, here, a configuration in which the radio control apparatus 50 exists independently of the secondary system 12 has been described. However, the present exemplary embodiment is not limited to the above configuration. For example, it may be configured such that the radio control apparatus 50 exists in a network of the secondary system 12. Further, it may also be configured such that radio control apparatus 50 is provided in a transmission station (the base station or the terminal station) of the secondary system 12.

The secondary information storage unit 508 stores the secondary information output from the signal reception unit 507. Note that the secondary information stored in the secondary information storage unit 508 is referenced by the propagation gain calculation unit 502, the transmission power calculation unit 504, the other receiving point interference evaluation unit 505, and the evaluation index calculation unit 506.

The propagation gain calculation unit 502 calculates a propagation gain from the base stations 201, 301, and 401 of the secondary system to the reception station 103 (in the present example, the reception stations 103-1 to 103-5) of the primary system. To be more specific, the propagation gain calculation unit 502 calculates a propagation loss $L_j^{SP0}$ [dB] ("j" represents a number of the secondary base station) from the base station of the secondary system to the primary terminal station by a predetermined propagation loss calculation formula using the primary information stored in the primary information storage unit 501 (for example, the positional information of the primary terminal station, the reception antenna height information, the surrounding geographical and planimetric feature information) and the secondary information stored in the secondary information storage unit 508 (for example, the information of frequency used by the secondary base station, the positional information of the secondary base station, and the transmission antenna height information). For example, when Hata model (medium-size city model) is used for calculation, the propagation loss is calculated with the following formula (1).

$$L_j^{SP0}=69.55+22.16\log(f)-13.82\log(h_b)-(1.1\log(f)-0.7)h_m+(1.56\log(f)-0.8)+(44.9-6.55\log(h_b))\log d \quad \text{Formula (1)}$$

Here, "f" represents a frequency used by the secondary base station, "$h_b$" represents the antenna height of the secondary base station, "$h_m$" represents the antenna height of the primary terminal station, and "d" represents the distance between the secondary base station and the primary terminal station.

Note that an example using Hata model (medium-size city model) for the calculation of the propagation loss has been described. However, the calculation model of the propagation loss is not limited to the above calculation model. For example, it may be configured such that a plurality of propagation gain calculation models is prepared in advance, and an optimum propagation gain calculation model is selected using the primary information (for example, the surrounding geographical and planimetric feature information) stored in the primary information storage unit 501. For example, the optimum propagation gain calculation model may be selected from among a large city model, a suburban area model, an open area model, and the like. Alternatively, other propagation models and propagation loss models may be used such as Sakagami model, Recommendation ITU-R P.1546 model, a plane earth propagation model, and a free space propagation loss model may be used for the calculation of the propagation loss.

Next, a propagation gain $G_j^{SP0}$ between the primary system and the secondary system is obtained with the following formula (2).

[Math. 1]

$$G_j^{SP0}=10^{-L_j^{SP0}/10} \quad \text{Formula (2)}$$

Here, the propagation gain has an inverse relationship with the propagation loss. Therefore, the fact that the propagation gain is large means the propagation loss is small and the propagation gain is small means the propagation loss is large. Further, the propagation gain between the system $G_j^{SP}$ between the terminal station (primary terminal station) of the primary system and the secondary base station is expressed by the following formula (3) in consideration of a reception antenna gain considering an antenna directional characteristic of the primary terminal station in the direction of the secondary base station and a transmission antenna gain considering a transmission antenna directional characteristic of the secondary base station in the direction of the primary terminal station.

$$G_j^{SP}=G_j^{SP0}\times TxG_j \times RxG_j \quad \text{Formula (3)}$$

Here, "$TxG_j$" represents the transmission antenna gain considering the transmission antenna directional characteristic of the secondary base station j in the direction of the primary terminal station. Also, "$RxG_j$" represents the reception antenna gain considering the antenna directional characteristic of the primary terminal station in the direction of the secondary base station j.

The propagation gain calculation unit 502 may calculate a propagation gain between the secondary base station and the terminal station existing in the coverage area of the secondary base station or a propagation gain between the terminal station (the terminal station existing in the coverage area of the secondary base station) and a base station different from the base station to which the terminal station is connected. Propagation gain information obtained in this way is output to the transmission power calculation unit 504, the other receiving point interference evaluation unit 505, and the evaluation index calculation unit 506, and is used for obtaining the transmission capacity of the secondary system. Note that the propagation gain between the secondary base station and the terminal station existing in the coverage are of the secondary base station is, for example, used as a propagation gain $G_{jk}$ in the formula (5) described below. Also, the propagation gain between the terminal station existing in the coverage area of the secondary base station and the base station different from the base station to which the terminal station is connected is, for example, used as $G_{hjl}^{SS}$ in the formula (6) described below.

The allowable interference power calculation unit 503 calculates an allowable interference power in the primary system and outputs it to the transmission power calculation unit 504 as allowable interference power information. The allowable interference power is, for example, obtained by S−23 [dBm] where a necessary reception signal power of the primary system is S [dBm] and the allowable SIR is defined as 23 [dB].

The transmission power calculation unit 504 calculates transmission power of each of the secondary base stations using the primary information, the secondary information, the propagation gain information calculated by the propagation gain calculation unit 502, and the allowable interference power information calculated by the allowable interference power calculation unit 503. To be more specific, with respect to a targeted primary terminal station, the transmission power calculation unit 504 obtains the transmission power of each of the secondary base stations for maximizing the transmission capacity of the primary system while suppressing the interference amount given by the secondary base stations into an allowable value or less. The transmission power calculation unit 504 outputs calculated transmission power to the other receiving point interference evaluation unit 505 as the transmission power information. Note that a more detailed configuration of the transmission power calculation unit 504 and method of calculating the transmission power in the transmission power calculation unit 504 will be described below.

The other receiving point interference evaluation unit 505 evaluates whether the interference amount is the allowable value or less in the primary terminal stations other than the primary terminal station targeted in the process in the transmission power calculation unit 504, using the primary information, the secondary information, the propagation gain information calculated by the propagation gain calculation unit 502, and the transmission power information calculated by the transmission power calculation unit 504. As a result, when the interference amount is the allowable value or less in all of the primary terminal stations, the other receiving point interference evaluation unit 505 notifies the evaluation index calculation unit 506 of that effect and the transmission power information from the transmission power calculation unit 504.

The evaluation index calculation unit 506 calculates an evaluation index for evaluating the transmission power indicated in the transmission power information and outputs it to the transmission power determination unit 509 as evaluation index information using the primary information, the secondary information, the propagation gain information calculated by the propagation gain calculation unit 502, and the transmission power information (here, information of the transmission power of the case where the interference amount is evaluated to be the allowable value or less in all of the primary terminal stations) calculated by the transmission power calculation unit 504. For example, as an evaluation index, the transmission capacity of the entire secondary system may be calculated. A transmission capacity C of the entire secondary system can be, for example, calculated using the following formula (4).

[Math. 2]

$$C = B \sum_{j=1}^{M} \sum_{k=1}^{K_j} \log_2(1 + SINR_{jk})$$ Formula (4)

Here, "B" represents the frequency band width to be used, "M" represents the number of the secondary base stations, and "$K_j$" represents the number of the terminal stations in the secondary base station j. Also, "$SINK_{jk}$" represents a signal to interference and noise ratio (SINR, signal-to-interference and noise power ratio) of each terminal station k in the coverage area of each secondary base station j. Note that the signal power ($S_{jk}$) and the interference power ($I_{jk}$) are respectively expressed by the following formulas (5) and (6).

$$S_{jk} = P_j G_{jk}$$ Formula (5)

[Math. 3]

$$I_{jk} = P_p G_{jk}^{PS} + \sum_{h=1, h \neq j}^{M} P_h G_{hjk}^{SS}$$ Formula (6)

Here, "$P_j$" represents the transmission power of the secondary base station j and "$G_{jk}$" represents the propagation gain from the secondary base station j to the secondary terminal station k existing in the coverage area of the secondary base station j. Also, "$P_p$" represents the transmission power of the primary base station, "$G_{jk}^{PS}$" represents the propagation gain from the primary base station to the secondary terminal station k existing in the coverage area of the secondary base station j, and "$G_{hjk}^{SS}$" represents the interference signal from the secondary base station h to the secondary terminal station k existing in the coverage area of the secondary base station j. Also, N is the noise power. Note that "$S_{jk}$", "$I_{jk}$", and "N" are expressed in antilogarithm.

Note that, here, the transmission capacity of the entire secondary system is calculated in a strict manner on the assumption that the secondary information includes the positional information of the secondary terminal station in which the traffic is occurring, the reception antenna height information, and the reception antenna directional characteristic information. However, the evaluation index is not limited to this. For example, by assuming one representative terminal ($K_j$=1) in each of the secondary base stations, the transmission capacity in the entire secondary system may be simply calculated. In so doing, $G_{jk}$, $G_{jk}^{PS}$, and $G_{hjk}^{SS}$ may be calculated based on the coverage area information of each of the secondary base stations, or a single value can be used in all of the base stations. Also, when the interference power from the primary base station and the interference power from the secondary base station that is different from the secondary base station to which the terminal station is connected are both negligibly small, it may be possible to set as $I_{jk}$=0. An example of such approximation being possible is a case where a targeted secondary base station is significantly away from the primary station and the secondary base stations are significantly away each other, and the like. Whether being significantly away or not may be, for example, judged whether the distances are respectively predetermined threshold values or more.

The transmission power determination unit 509 executes the process from the calculation of the transmission power in the transmission power calculation unit 504 to the calculation of the evaluation index in the evaluation index calculation unit 506 with respect to all of the primary terminal stations, and then, determines final transmission power of the secondary base station based on the evaluation index information calculated in each of the primary terminal stations. To be more specific, the transmission power determination unit 509 determines the transmission power to the primary terminal station that maximizes the transmission capacity of the secondary system calculated in each of the primary stations as the final transmission power of the secondary base station. Transmission power determination information that is information of the determined transmission power is output to the signal transmission unit 510 and is transmitted to each of the secondary base stations 201, 301, and 401 via the signal transmission unit 510.

The signal transmission unit 510 transmits the information of the transmission power determined by the transmission power determination unit 509 to each of the secondary base stations, as needed.

Figure 5:
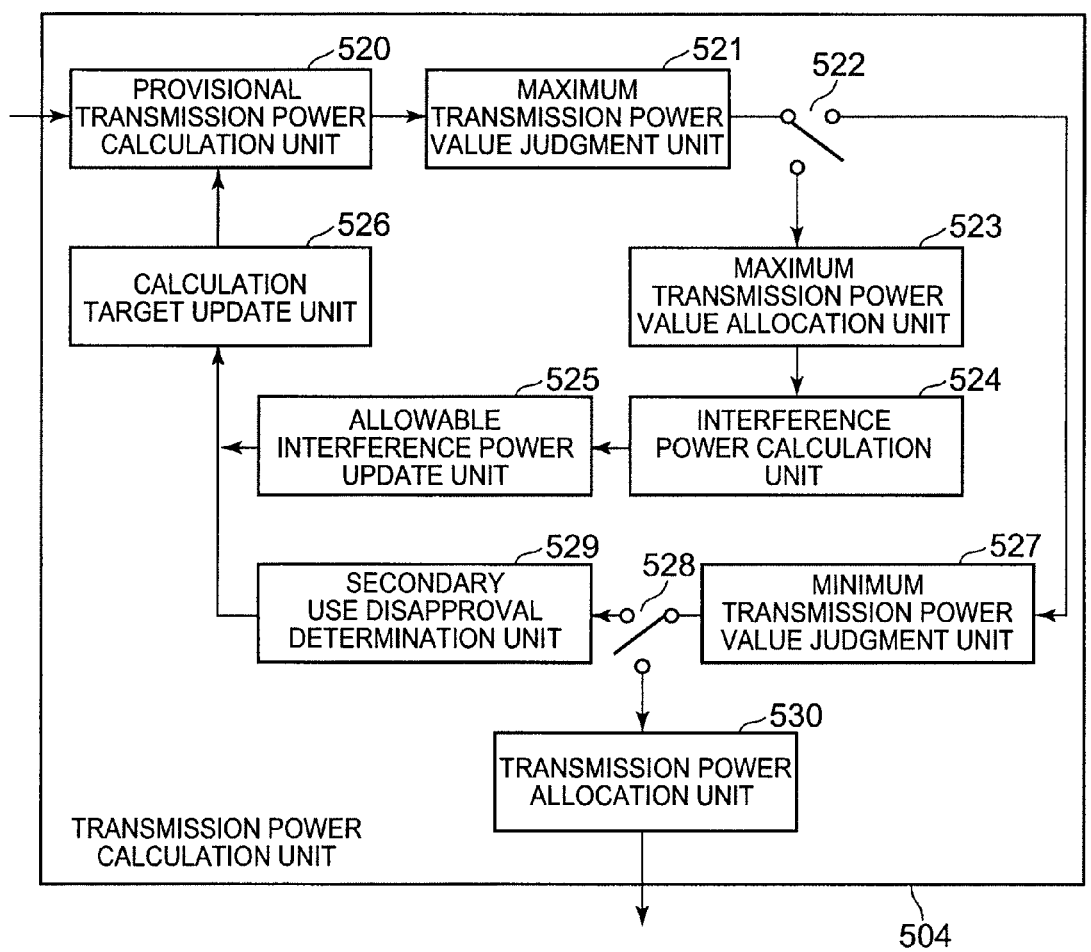
FIG. 5 It depicts a block diagram illustrating a configuration example of a transmission power calculation unit of the first exemplary embodiment.

FIG. 5 is a block diagram illustrating a configuration example of the transmission power calculation unit 504. The transmission power calculation unit 504 illustrated in FIG. 5 includes a provisional transmission power calculation unit 520, a maximum transmission power value judgment unit 521, a switch unit 522, a maximum transmission power value allocation unit 523, an interference power calculation unit 524, an allowable interference power update unit 525, a calculation target update unit 526, a minimum transmission power value judgment unit 527, a switch unit 528, a secondary use disapproval determination unit 529, and a transmission power allocation unit 530.

The provisional transmission power calculation unit 520 calculates provisional transmission power (provisional transmission power) of each of the secondary base stations to be calculated. The provisional transmission power calculated here is modified through comparison with an allowable maximum transmission power value, a necessary minimum power value, and the like, and is determined to be the final transmission power. The provisional transmission power calculation unit 520 outputs calculated provisional transmission power to the maximum transmission power value judgment unit 521 as provisional transmission power information.

A method of calculating the provisional transmission power in the provisional transmission power calculation unit 520 includes several calculation methods. The first method of calculating the provisional transmission power in the provisional transmission power calculation unit 520 is a method in which the provisional transmission power from each of the secondary base stations is calculated in such a way that the interference power caused by each of the secondary base stations to the reception station of the primary system becomes equal. To be specific, the provisional transmission power calculation unit 520 calculates provisional transmission power $P'_j$ of the secondary base station j using the following formula (7).

[Math. 4]

$$P'_j = \frac{I_{allow}}{M' G_j^{SP}} \quad \text{Formula (7)}$$

Here, "$I_{allow}$" represents the allowable interference power information. Also, "M'" represents the number of the secondary base stations to be calculated.

The second method of calculating the provisional transmission power in the provisional transmission power calculation unit 520 is a method according to the following formula (8).

[Math. 5]

$$P'_j = \frac{I_{allow}}{M' G_j^{SP}} + \frac{(P_p G_j^{PS} + N)\left(\overline{G}_j \sum_{i=1}^{M'} \frac{G_i^{SP}}{\overline{G}_i} - M' G_j^{SP}\right)}{M' \overline{G}_j G_j^{SP}} \quad \text{Formula (8)}$$

Here, "$G_j$" with a bar is a central value of the propagation gains in the secondary base station j to the terminal station. Note that "$P_p G_j^{PS}$" represents the interference power from the primary base station to the secondary terminal station. Note that, if this value is smaller than the noise power N, it may be possible to set $P_p G_j^{PS}=0$.

The formula (8) theoretically calculates transmission power of the secondary base station j for maximizing the transmission capacity of the secondary terminal station as the reception station of the secondary base station under the condition where the interference amount given to the primary reception station from all of the secondary base stations to be calculated is the allowable value. Also, the formula (7) neglects the second term of the formula (8) on the assumption that this term is small.

The maximum transmission power value judgment unit 521 compares the provisional transmission of each of the secondary base stations calculated by the provisional transmission power calculation unit 520 and the allowable maximum transmission power value of each of the secondary base stations indicated in the secondary information stored in the secondary information storage unit 508. Then, the maximum transmission power value judgment unit 521 switches a destination to be connected of the switch unit 522 (here, it means a destination to output of the provisional transmission power information that implies a next control instruction from the maximum transmission power value judgment unit 521) according to a result of the comparison. Here, when one or more secondary base stations having the allowable maximum transmission power value or more is included in the provisional transmission power information of each of the secondary base stations, the switch unit 522 is switched in such a way that an output of the maximum transmission power value judgment unit 521 is connected to the maximum transmission power value allocation unit 523. In this case, the provisional transmission power information is output to the maximum transmission power value allocation unit 523. Meanwhile, when the secondary base station having the allowable maximum transmission power value or more is not included in the provisional transmission power information of each of the secondary base station, the switch unit 522 is switched such that the output of the maximum transmission power value judgment unit 521 is connected to the minimum transmission power value judgment unit 527. In this case, the provisional transmission power information is output to the minimum transmission power value judgment unit 527.

When one or more secondary base stations having the allowable maximum transmission power value or more is included in the provisional transmission power information of each of the secondary base stations, the maximum transmission power value allocation unit 523 performs correction of the allowable maximum transmission power in response to the provisional transmission power information from the maximum transmission power value judgment unit 521. The maximum transmission power value allocation unit 523 allocates the allowable maximum transmission power value as the transmission power of the base station to all of the secondary base stations in which the provisional transmission power is the allowable maximum transmission power value or more. Then, the maximum transmission power value allocation unit 523 changes the value of the provisional transmission power of an appropriate secondary base station to update the provisional transmission power information, and outputs it to the interference power calculation unit 524 and the allowable interference power update unit 525. Note that the information of the secondary base station to which the allowable maximum transmission power value has been allocated may just be output from the maximum transmission power value allocation unit 523 to the allowable interference power update unit 525. Therefore, the maximum transmission power value allocation unit 523 may output the information of the secondary base station to the allowable interference power update unit 525 via the interference power calculation unit 524 described below.

The interference power calculation unit 524 extracts the information of the secondary base station to which the allowable maximum transmission power value has been allocated. Then, the interference power calculation unit 524 calculates interference power $I_{after}$ given to the primary terminal station when a signal is transmitted with the allowable maximum transmission power with respect to all of the extracted secondary base stations. The interference power $I_{after}$ can be, for example, calculated with the following formula (9). Note that the calculated interference power is output to the allowable interference power update unit 525 as the interference power information. Note that the interference power calculation unit 524 also outputs the information of the secondary base station to which the allowable maximum transmission power value has been allocated, as needed.

[Math. 6]

$$I_{after} = \sum_{j}^{X} (P_j^{MAX} G_j^{SP})$$ Formula (9)

Here, "$P_j^{MAX}$" represents the allowable maximum transmission power value and "X" represents the number of the secondary base stations to which the allowable maximum transmission power value has been allocated.

The allowable interference power update unit 525 updates the allowable interference power information $I_{allow}$ using the following formula (10) based on the interference power information output from the interference power calculation unit 524. Note that the allowable interference power updated here is used for following recalculation of the provisional transmission power in the provisional transmission power calculation unit 520. The allowable interference power update unit 525 outputs the update of the allowable interference power to the calculation target update unit 526. Note that the allowable interference power update unit 525 also outputs the information of the secondary base station to which the allowable maximum transmission power value has been allocated, as needed.

$$I_{allow} -= I_{after}$$ Formula (10)

Meanwhile, the minimum transmission power value judgment unit 527 performs correction (here, condition judgment) with the necessary minimum transmission power value in response to the provisional transmission power information from the maximum transmission power value judgment unit 521 when no secondary base station having the allowable maximum transmission power value or more is included in the provisional transmission power information of each of the secondary base stations. The minimum transmission power value judgment unit 527 extracts the secondary base station to which the minimum provisional transmission power is allocated from among the provisional transmission power calculated in the provisional transmission power calculation unit 520. The minimum transmission power value judgment unit 527 compares the extracted provisional transmission power of the extracted secondary base station and the necessary minimum transmission power value of the secondary base station indicated in the secondary information stored in the secondary information storage unit 508. Then, the minimum transmission power value judgment unit 527 switches a destination to be connected of the switch unit 528 (here, it means a destination to output of a minimum transmission power judgment result that implies a next control instruction from the minimum transmission power value judgment unit 527) according to a result of the comparison.

The minimum transmission power value judgment unit 527 switches the switch unit 528 so as to be connected to the secondary use disapproval determination unit 529 when the provisional transmission power to be evaluated is less than the necessary minimum transmission power value. In this case, the minimum transmission power judgment result is output to the secondary use disapproval determination unit 529. Meanwhile, when the provisional transmission power to be evaluated is the necessary minimum transmission power value or more, the minimum transmission power value judgment unit 527 switches the switch unit 528 to be connected to the transmission power allocation unit 530. In this case, the minimum transmission power judgment result is output to the transmission power allocation unit 530.

The secondary use disapproval determination unit 529 performs judgment of disapproval of the secondary use with respect to the targeted secondary base station in response to the minimum transmission power judgment result from the minimum transmission power value judgment unit 527 when no secondary base station having the allowable maximum transmission power value or more is included in the provisional transmission power information in each of the secondary base stations and when the provisional transmission power to be evaluated as the minimum provisional transmission power in the provisional minimum power allocated to each of the secondary base stations is less than the necessary minimum transmission power value. The secondary use disapproval determination unit 529 performs judgment of disapproval of the secondary use of the targeted frequency band with respect to the secondary base station judged that the transmission power is less than the necessary minimum power value based on the received minimum transmission power judgment result. Then, the secondary use disapproval determination unit 529 outputs a result thereof to the calculation target update unit 526 as a secondary use disapproval judgment result.

The calculation target update unit 526 determines a next secondary base station to be calculated, to which the provisional transmission power is to be allocated, upon receiving information about the update of the allowable interference power from the allowable interference power update unit 525 and a secondary use judgment result from the secondary use disapproval determination unit 529, as a result of the allowable maximum transmission power being allocated to one or more secondary base stations. The calculation target update unit 526 excludes the secondary base station to which the allowable maximum transmission power value has been allocated in the maximum transmission power value allocation unit 523 and the secondary base station judged that the secondary use is not allowed in the secondary use disapproval determination unit 529 from a next target to be calculated to which the provisional transmission power is to be allocated. Then, if any secondary base station remains as a result of the exclusion, the calculation target update unit 526 outputs calculation target information that indicates that the secondary base station is a target to be calculated to the provisional transmission power calculation unit 520.

The provisional transmission power calculation unit 520 newly calculates provisional transmission power with respect to the secondary base station indicated as the target to be calculated based on the input calculation target information. Then, the provisional transmission power calculation unit 520 outputs a result thereof to the maximum transmission power value judgment unit 521 as the provisional transmission power information.

In this way, the calculation of the provisional transmission power is repeatedly performed until a predetermined condition is satisfied. In the end, all of the secondary base stations to be calculated are either judged that the secondary use is not allowed or allocated a value that is the allowable maximum transmission power or less and the necessary minimum transmission power value or more.

Here, in the minimum transmission power value judgment unit 527, when the provisional transmission power of a target to be evaluated is the necessary minimum transmission power value or more, as described above, the switch unit 528 is switched in such a way that the destination to output of the minimum transmission power value judgment unit 527 is connected to the transmission power allocation unit 530. Then, the minimum transmission power judgment result is output to the transmission power allocation unit 530.

The transmission power allocation unit 530 allocates the provisional transmission power output from the provisional transmission power calculation unit 520 to the secondary base station to be calculated (the secondary base station to which the transmission power has not been allocated) at this point as the transmission power of the secondary base station. Then, the transmission power allocation unit 530 outputs a final allocation result to the other receiving point interference evaluation unit 505 as the transmission power information.

Note that, in the present exemplary embodiment, the primary information storage unit 501 and the secondary information storage unit 508 are, for example, realized by a memory device. Also, the propagation gain calculation unit 502, the allowable interference power calculation unit 503, the transmission power calculation unit 504, the other receiving point interference evaluation unit 505, and the evaluation index calculation unit 506 are, for example, realized by hardware configured to perform predetermined signal processing or a processor unit such as a CPU that operates in accordance with a program. Note that the above units may not preclude being realized by separate units, respectively. Also, the signal reception unit 507 and the signal transmission unit 510 are, for example, realized by hardware configured to perform predetermined signal processing or a processor unit such as a CPU that operates in accordance with a program, and a transmission/reception antenna.

Figure 6:
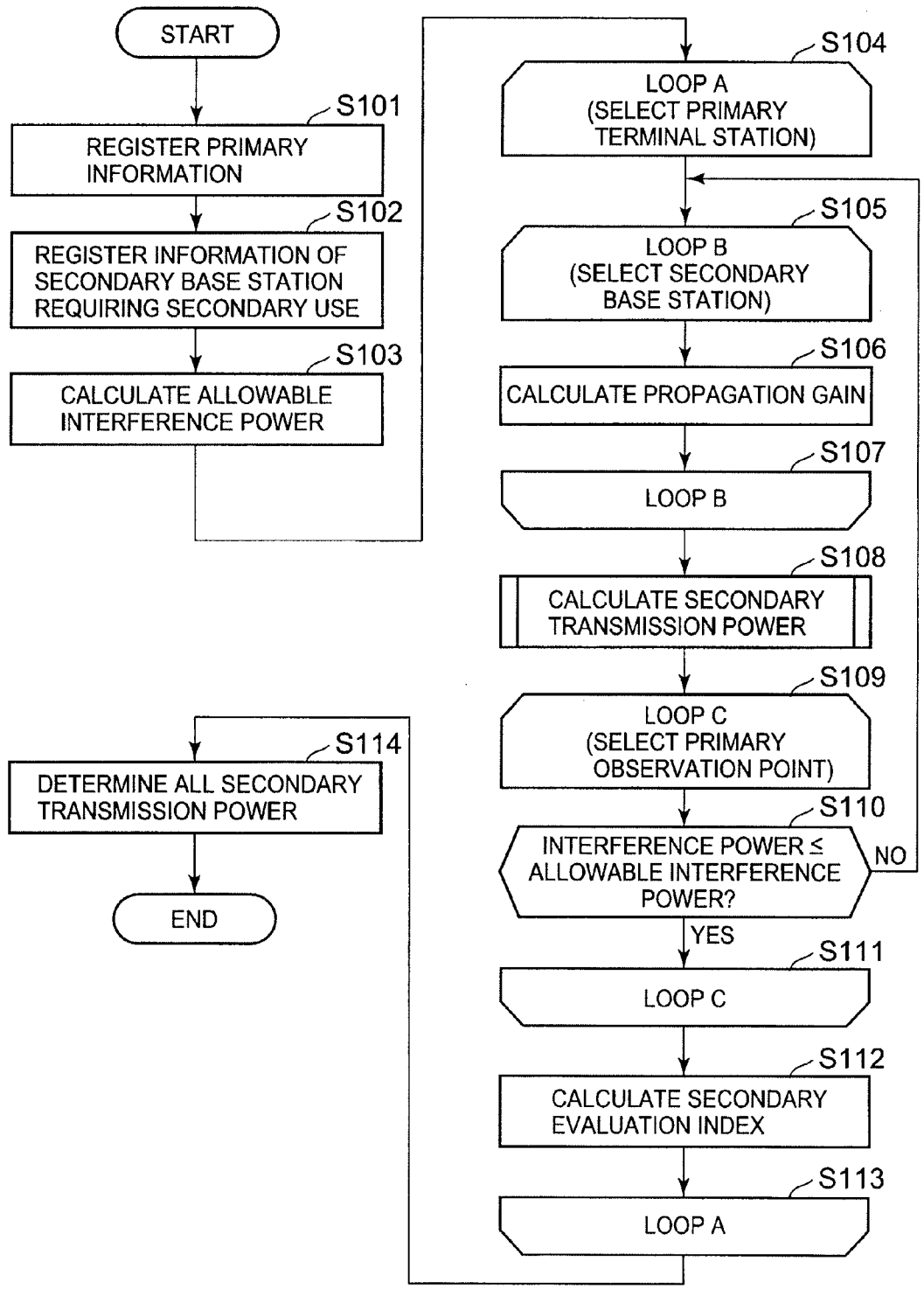
FIG. 6 It depicts a flowchart illustrating an example of an entire operation of the radio control apparatus of the first exemplary embodiment.

Next, an operation of the present exemplary embodiment will be described. FIG. 6 is a flowchart illustrating an example of an operation of the entire radio control apparatus 50.

First, the radio control apparatus 50 acquires the primary information from the primary DB 104 and stores it in the primary information storage unit 501 (step S101). The acquisition of the primary information and the storage to the primary information storage unit 501 may be, for example, performed by a primary information acquisition means (not illustrated) or the acquisition and storage of at least a part of the information may be performed by a user operation or the like in advance.

Next, the signal reception unit 507 acquires the secondary information from the secondary base station that requires the secondary use and stores the information in the secondary information storage unit 508 (step S102). Also, the allowable interference power calculation unit 503 calculates allowable interference power using the primary information (step S103).

Next, the transmission power calculation unit 504 calculates transmission power of the secondary base station with respect to each of the primary receiving points (in the present example, the primary terminal stations) (steps S104 to S113: Loop A).

In Loop A, first, the propagation gain calculation unit 502 calculates propagation gain between each of the secondary base stations and a targeted primary terminal station (steps S105 to S107: Loop B). The propagation gain calculation unit 502 selects, in Loop B, a secondary base station that requires the secondary use one by one and sequentially calculates a propagation gain between the selected secondary base station and the targeted primary terminal station (step S106).

In step (step S106) of the calculation of the propagation gain, the propagation gain calculation unit 502 calculates a propagation gain between the selected secondary base station and the targeted primary terminal station. The propagation gain calculation unit 502 may calculate, other than that, the propagation gain between the secondary base station and the terminal station existing in the coverage area of the base station and the propagation gain between the terminal station and a base station different from the base station to which the terminal station is connected.

When Loop B is completed, next, the transmission power calculation unit 504 calculates, with respect to the targeted primary terminal station, transmission power of each of the secondary base stations for maximizing the transmission capacity of the primary system while suppressing the interference amount given by the secondary base station into the allowable value or less (step S108). Details of the transmission power calculation step will be described below.

When the transmission power calculation step is completed, next, the other receiving point interference evaluation unit 505 confirms whether the interference amount in all of the primary terminal stations is the allowable value or less, with respect to the calculated transmission power of each of the secondary base stations (steps S5109 to S111: Loop C). To be specific, the other receiving point interference evaluation unit 505 selects a primary terminal station other than the targeted primary terminal station (primary reception station) one by one as a primary observation point. Then, the other receiving point interference evaluation unit 505 judges, with respect to the selected primary terminal station, whether the interference power in the calculated transmission power of each of the secondary base stations is the allowable interference power or less (step S110). In step S110, in the transmission power of each of the secondary base stations with respect to a certain primary terminal station, when it is judged that the interference power is the allowable interference power or less (Yes in step S110), another primary terminal station is selected as the primary observation point, and similar judgment is performed.

In Loop C, when it is judged that the interference power in the transmission power of each of the secondary base stations with respect to a certain primary terminal station exceeds the allowable interference power (No in step S110), the other receiving point interference evaluation unit 505 judges that the transmission power setting value of each of the current secondary base stations is improper, and determines that the calculated transmission power is not employed. In this case, the radio control apparatus 50 returns to the top of Loop A, selects a next primary terminal station, and performs the processes from step S105 with respect to the selected primary terminal station.

Meanwhile, when the interference power is the allowable interference power or less in all of the primary terminal stations, Loop C is completed and the process proceeds to step S112. In step S112, the evaluation index calculation unit 506 calculates, for example, transmission capacity as an evaluation index of the secondary system in a case of using the transmission power of a certain secondary base station.

When the above process (steps S105 to S112) with respect to all of the primary terminal stations is performed, Loop A is completed (step S113), and the process proceeds to step S114.

In step S114, the transmission power determination unit 509 determines, based on a result of the above process, the transmission power from among the transmission power of the secondary base station that satisfies the allowable interference power with respect to the primary terminal station where the transmission capacity of the secondary system is maximized as the final transmission power of the secondary base station.

Figure 7:
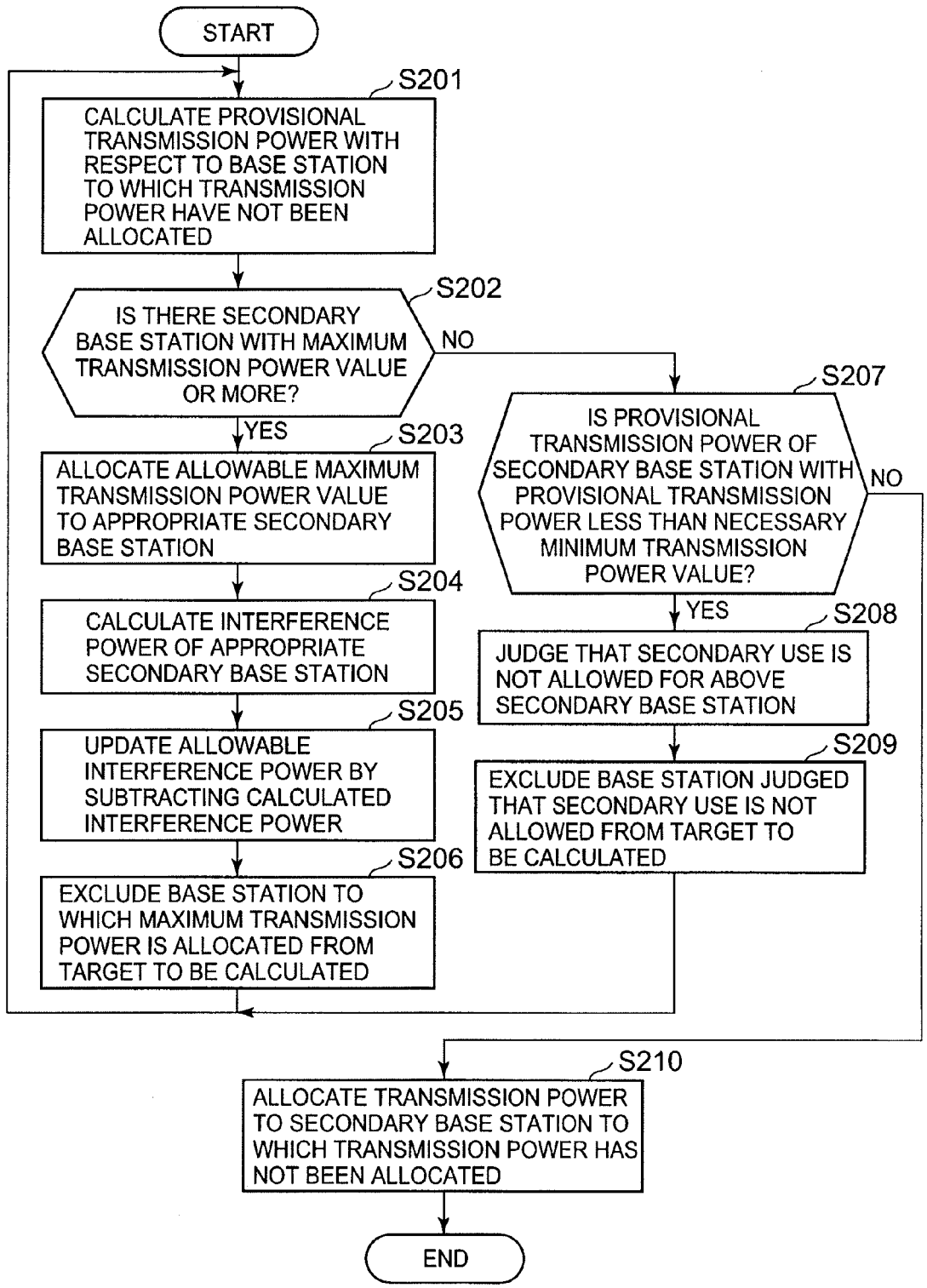
FIG. 7 It depicts a flowchart illustrating a more detailed example of the transmission power calculation unit of the first exemplary embodiment.

Next, a step of calculating the transmission power of the secondary base station (step S108) will be described. FIG. 7 is a flowchart illustrating an example of more detailed operation of the step of calculating the transmission power of the secondary base station.

In the step of calculating the transmission power of the, first, the provisional transmission power calculation unit 520 calculates provisional transmission power of all of the secondary base stations (step S201). The calculated provisional transmission power in this step is modified through comparison with the allowable maximum transmission power value, the necessary minimum power value, and the like described below and is determined to be the final transmission power.

Next, the maximum transmission power value judgment unit 521 judges whether there is one or more secondary base stations having the allowable maximum transmission power value or more from among the calculated provisional transmission power (step S202). When there is one or more secondary base stations having the allowable maximum transmission power value or more (Yes in step S202), the process proceeds to step S203.

In step S203, the maximum transmission power value allocation unit 523 allocates the allowable maximum transmission power value to all of appropriate secondary base stations. Next, the interference power calculation unit 524 calculates interference power given to the primary terminal station when a signal is transmitted from all of the appropriate secondary base stations with the allowable maximum transmission power (step S204).

Then, the allowable interference power update unit 525 subtracts the calculated interference power from the original allowable interference power and updates the allowable interference power (step S205). Then, the calculation target update unit 526 excludes the secondary base station to which the allowable maximum transmission power value has been allocated from a next target to be calculated to which the provisional transmission power is to be allocated (step S206) and performs a process of calculating the provisional transmission power again with respect to the rest of the secondary base stations (the secondary base stations to which the transmission power has not been allocated) (returns to step S201).

Meanwhile, in step S202, when no secondary base station with the allowable maximum transmission power value or more exists (No in step S202), the process proceeds to step S207.

In step S207, the minimum transmission power value judgment unit 527 extracts the secondary base station to which a minimum provisional transmission power from among the calculated provisional transmission power is allocate and judges whether the provisional transmission power of the appropriate secondary base station is less than the necessary minimum transmission power value. When the provisional transmission power of the secondary base station having the minimum provisional transmission power is less than the necessary minimum transmission power value (Yes in step S207), the process proceeds to step S208.

In step S208, the secondary use disapproval determination unit 529 judges (decides) that the secondary use of a targeted frequency band is not allowed with respect to the secondary base station (step S208). Then, the calculation target update unit 526 excludes the secondary base station judged that the secondary use is not allowed from the next target to be calculated, to which the transmission power is to be allocated (step S209). Then, the provisional transmission power calculation unit 520 performs a process of calculating the provisional transmission power again with respect to the rest of the secondary base stations (the secondary base station to which the transmission power has not been allocated) (returns to step S201).

Meanwhile, in step S207, when the provisional transmission power of the secondary base station having the minimum provisional transmission power is the necessary minimum transmission power or more (No in step S207), the transmission power calculated in step S201 is allocated as the transmission power of the appropriate base station to the secondary base station to be calculated at this point (the secondary base station to which the transmission power has not been allocated) (step S210).

Note that, in the above-description, the configuration and the flowchart of FIGS. 5 and 7 have been illustrated as the transmission power calculation method for each of the secondary base stations by the transmission power calculation unit 504. However, the present exemplary embodiment is not limited to the above method. For example, the transmission power of each of the secondary base stations may be calculated using an optimization algorithm by a typical numerical analysis. A specific example of the optimization algorithm includes application of Newton's method. In so doing, the following formulas (11) and (12) are constraint conditions.

[Math. 7]

$$\sum_{j=1}^{M'} P_j G_j^{SP} = I_{allow} \qquad \text{Formula (11)}$$

$$P_{MIN} \le P_j \le P_{MAX} \qquad \text{Formula (12)}$$

Here, "$P_{MIN}$" represents a necessary minimum transmission power value and "$P_{MAX}$" represents an allowable maximum transmission power value. At this time, a provisional transmission power Pj of the secondary base station is determined so as to maximize a system transmission capacity C of the secondary system defined by the above-described formula (4).

Further, in calculating the transmission power of each of the secondary base stations by the transmission power calculation unit 504 of the present exemplary embodiment, the transmission power of each of the secondary base stations is, on assumption that the allowable maximum transmission power value and the necessary minimum transmission power value are defined for each of the secondary base stations, caused to fall within these value ranges.

In a case where the allowable maximum transmission power value or the necessary minimum transmission power value is not defined in the secondary base station, related processes are not necessary. For example, when the allowable maximum transmission power value is not defined, regarding the configuration, the maximum transmission power value judgment unit 521, the switch unit 522, the maximum transmission power value allocation unit 523, the interference power calculation unit 524, and the allowable interference power update unit 525 in the configuration example of the transmission power calculation unit 504 illustrated in FIG. 5 are not necessary. Also, regarding the operation, the process of steps S202 to S206 in the transmission power calculation steps of the secondary base station illustrated in FIG. 7 is not necessary. Meanwhile, when the necessary minimum transmission power value is not defined, regarding the configuration, the minimum transmission power value judgment unit 527, the switch unit 528, and the secondary use disapproval determination unit 529 in the configuration example of the transmission power calculation unit 504 illustrated in FIG. 5 become unnecessary. Also, regarding the operation, the process of steps S207 to S209 in the transmission power calculation steps of the secondary base station of the radio control apparatus 50 illustrated in FIG. 7 is not necessary.

Here, when the allowable maximum transmission power value and the necessary minimum transmission power value are both not defined, regarding the configuration, the calculation target update unit 526, in addition to the maximum transmission power value judgment unit 521, the switch unit 522, the maximum transmission power value allocation unit 523, the interference power calculation unit 524, the allowable interference power update unit 525, minimum transmission power value judgment unit 527, the switch unit 528, and the secondary use disapproval determination unit 529 of the configuration example of the transmission power calculation unit 504 illustrated in FIG. 5 become unnecessary. Further, regarding the operation, the process of steps S202 to S209 in the transmission power calculation steps of the secondary base station of the radio control apparatus 50 illustrated in FIG. 7 becomes unnecessary.

Also, in the above description, an example has been illustrated in which the secondary transmission power is calculated for all of the primary terminal stations, and then, the transmission power to the primary terminal station, the transmission capacity thereof being the maximum, is determined to be the final transmission power of the secondary base station. However, the present exemplary embodiment is not limited to this example. For example, when the position of the primary terminal station is not known, the coverage area of the primary terminal station is divided into predetermined meshed areas, the observation point is set in the meshed areas, and the observation point may be treated as the primary terminal station.

Alternatively, the primary terminal stations, the interference power thereto from the secondary base station being large, are selected in advance and the process of steps S104 to S113 may be performed with respect to the selected primary terminal stations, instead of performing the process of steps S104 to S113 of FIG. 6 with respect to all of the primary terminal stations. As a method of selecting the primary terminal stations, the interference power thereto from the secondary base station being large, for example, any primary terminal station that has the maximum propagation gain from the secondary base station that requires the secondary use or that has the shortest distance from the secondary base station may just be selected.

Also, the primary reception station that the interference from the secondary base station affects is substantially one point, the calculation of the propagation gain (step S106) or the calculation of the transmission power of the secondary base station (step S108) with respect to this point may be performed. In this case, Loop A, Loop C, the calculation of the secondary evaluation index (step S112) and the like are not necessary. That is, the transmission power of the secondary base station calculated in step S108 as is may just be the final transmission power of the secondary base station. As the case where the primary reception station that the interference from the secondary base station affects is substantially one point, a case can be considered, for example, in which the primary system uses the frequency band 21 illustrated in FIG. 2 or the frequency band 31 illustrated in FIG. 3 in an up link. Also, as the above-described case, a case can be considered, for example, in which the terminal station of the primary system is one or limited to a small number.

Also, in the above description, the case where the frequency band 22 illustrated in FIG. 2 or the frequency band 32 illustrated in FIG. 3 is used in a downlink of the secondary system has been described. Other than the above, a configuration may be employed wherein the frequency band that is allocated to the primary system is used in the up link or the frequency band, the preferential use thereof being allowed is used. In this case, the terminal station of the secondary system serves as the transmission station of the secondary system. At this time, all of the terminal stations may be individually treated to determine the transmission power. Alternatively, one representative terminal station is selected from each of the secondary base stations, the transmission power is determined with respect to the selected representative terminal, and this transmission power may be caused to be the (maximum) transmission power of an up signal in this selected base station. As the representative terminal station, it is favorable to select a terminal station having a small propagation gain from the secondary base station or positioned away from the secondary base station, and having a large propagation gain or positioned close to the primary reception.

Also, in the above description, although it has been described that the secondary base stations 201, 301, and 401 belong to one secondary system, it is not necessary for all of the secondary base stations to belong to the same system. For example, the present exemplary embodiment can be applied to a base station or a terminal station that belongs to different systems that are different as the secondary transmission station.

As described above, according to the present exemplary embodiment, in the secondary system 12 that secondarily uses the frequency band allocated as the system band of the primary system 11 or the preferential use thereof being allowed, the transmission power (that is, the secondary transmission power) value can be properly set in such a way that the transmission capacity of the secondary system can be maximized or approximated to the maximum value while the allowable value of the interference amount given to the primary system 11 is satisfied. This is because a control method is employed in which the transmission power is distributed to each of the secondary base stations based on at least the interference amount given to the primary reception station. Also, the secondary transmission power can be properly set under a realistic constraint condition by adding the maximum value/minimum value of the secondary transmission station to the condition.

Exemplary Embodiment 2

Next, a second exemplary embodiment according to the present invention will be described. In the present exemplary embodiment, a method of allocating the allowable maximum transmission power value in the order of secondary base station having a smaller propagation gain to a larger propagation gain given to the primary system as long as the allowable value of the interference amount given to the reception station of the primary system is satisfied will be described.

In the present exemplary embodiment, the description will be given with reference to the system configuration diagram illustrated in FIG. 1. Hereinafter, in the present exemplary embodiment, the distances between each of the secondary base stations 201, 301, and 401, and the terminal station 103-5 of the primary system are respectively d1, d2, and d3. Also, propagation gains (propagation gains between systems) $G_{201}^{SP}$, $G_{301}^{SP}$, and $G_{401}^{SP}$ from each of the secondary base stations to the terminal station 103-5 calculated based on the above distances will be described by taking an example where the relationship of $G_{201}^{SP} > G_{301}^{SP} > G_{401}^{SP}$ is established. In the present exemplary embodiment, it is judged whether the allowable maximum transmission power value can be allocated in the order of secondary base station having a smaller propagation gain to a larger propagation gain (in this example, in the order of the secondary base stations 401→301→201), and if it can, the allowable maximum transmission power value is allocated to an appropriate base station.

Hereinafter, the description will be given using a specific example. First, the secondary base station 401 having the minimum propagation gain to the terminal station 103-5 of the primary system is selected from among the secondary base stations 201, 301, and 401, and the allowable maximum transmission power value is set. At this time, an interference power $I_{401}$ from the secondary base station 401 to which the allowable maximum transmission power value has been allocated to the terminal station 103-5 of the primary system is calculated and compared with an allowable interference power $I_{allow}$. Then, when the interference power $I_{401}$ is the allowable interference power or less, the allowable maximum transmission power value is allocated to the secondary base station 401. Then, the interference power $I_{401}$ is subtracted from the allowable interference power $I_{allow}$ and the allowable interference power $I_{allow}$ is updated as a new allowable interference power $I_{allow}$. The transmission power of each of the secondary base stations is determined by executing such an operation in the order of secondary base station having a smaller propagation gain to a larger propagation gain one by one.

In so doing, when the allowable maximum transmission power value is allocated to a certain secondary base station, there may be timing at which the interference power exceeds the allowable interference power. For example, when the allowable maximum transmission power value is allocated to the secondary base station 301 having the second minimum propagation gain, assume that the interference power $I_{301}$ from the secondary base station 301 to which the allowable maximum transmission power value is allocated to the terminal station 103-5 of the primary system exceeds the current allowable interference power $I_{allow}$. In such a case, transmission power $P_{301}$ of the secondary base station 301 is calculated with, for example, the following formula (13), using the current allowable interference power $I_{allow}$ and the propagation gain $G_{301}^{SP}$ from secondary base station 301 to the primary terminal station. Note that, in the present example, the secondary base station j is the secondary base station 301.

[Math. 8]

$$P_{301} = \frac{I_{allow}}{G_{301}^{SP}} \quad \text{Formula (13)}$$

At this time, because all of the transmission power equivalent to the allowable interference power is allocated to the secondary base station 301, the transmission power cannot be allocated to the secondary base station 201 that has a larger propagation gain than the secondary base station 301. Therefore, in the present exemplary embodiment, in such a case, it is judged that the secondary use is not allowed with respect to the rest of the secondary base stations (in the present example, the secondary base station 201).

Next, a configuration of the present exemplary embodiment will be described in more detail. The entire configuration of a radio control apparatus 50 according to the present exemplary embodiment is similar to FIG. 4. However, the radio control apparatus 50 of the present exemplary embodiment includes a transmission power calculation unit 504A instead of the transmission power calculation unit 504.

Figure 8:
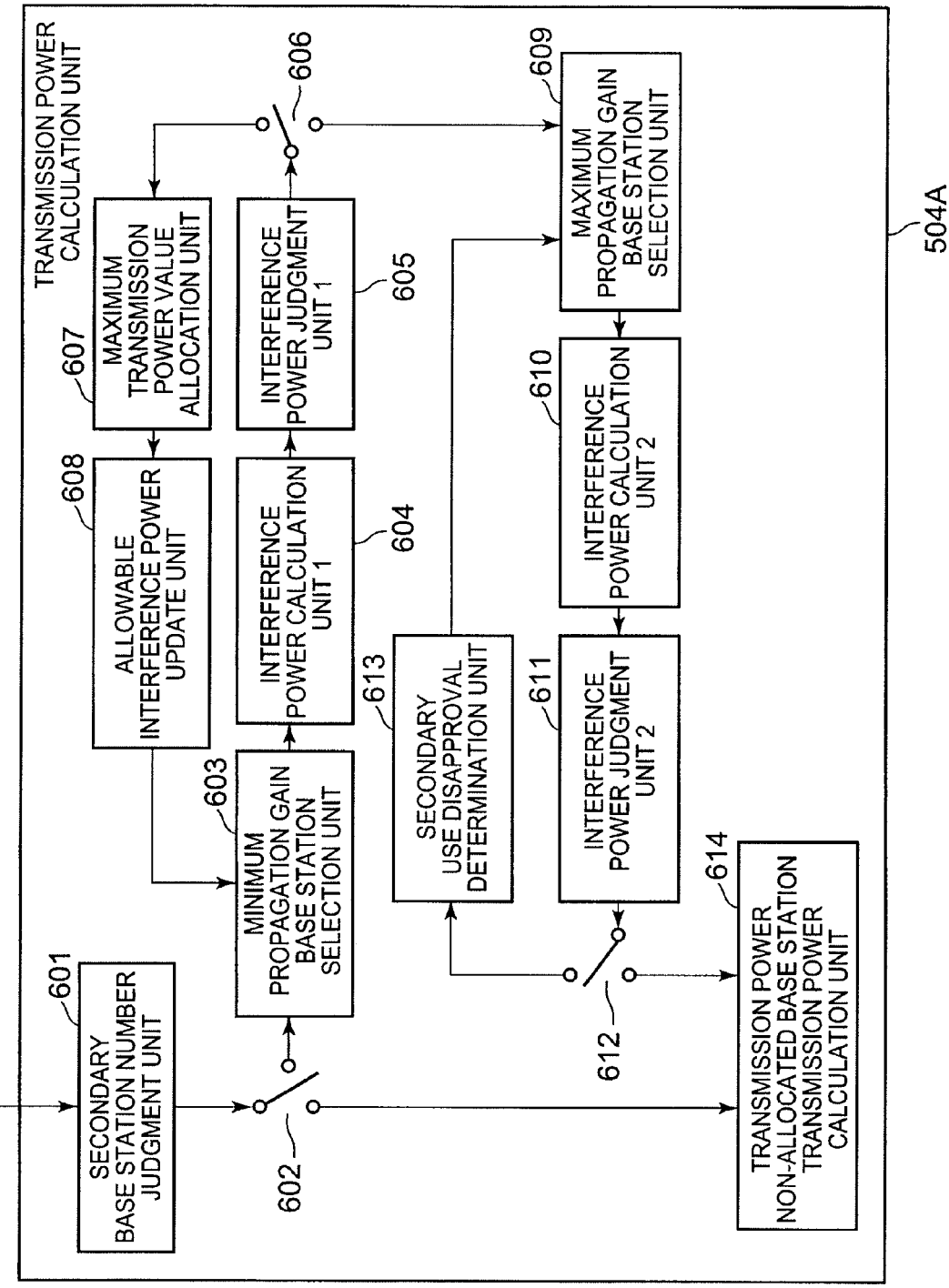
FIG. 8 It depicts a block diagram illustrating a configuration example of a transmission power calculation unit of a second exemplary embodiment.

FIG. 8 is a block diagram illustrating a configuration example of the transmission power calculation unit 504A. The transmission power calculation unit 504A illustrated in FIG. 8 includes a secondary base station number judgment unit 601, a switch unit 602, a minimum propagation gain base station selection unit 603, a first interference power calculation unit 604, a first interference power judgment unit 605, a switch unit 606, a maximum transmission power value allocation unit 607, an allowable interference power update unit 608, a maximum propagation gain base station selection unit 609, a second interference power calculation unit 610, a second interference power judgment unit 611, a switch unit 612, a secondary use disapproval determination unit 613, and a transmission power non-allocated base station transmission power calculation unit 614.

The secondary base station number judgment unit 601 judges the number of the secondary base stations that require the secondary use and controls a destination to be connected of the switch unit 602 in accordance with the number of the secondary base stations that require the secondary use. The secondary base station number judgment unit 601 causes the switch unit 602 to be connected to the minimum propagation gain base station selection unit 603 as a next destination to output of a control instruction when the number of the secondary base stations that require the secondary use is two or more. Meanwhile, when the number of the secondary base stations that require the secondary use is one or less, the secondary base station number judgment unit 601 switches the switch unit 602 to be connected to the transmission power non-allocated base station transmission power calculation unit 614.

The minimum propagation gain base station selection unit 603 selects a secondary base station having the minimum propagation gain to a targeted primary system terminal station from among the secondary base stations to be calculated at this point (the secondary base stations to which the transmission power has not been allocated), and outputs information to the first interference power calculation unit 604 as minimum propagation gain base station information.

The first interference power calculation unit 604 calculates interference power $I_{test}$ to the primary system terminal station when the allowable maximum transmission power value is allocated to a secondary base station j selected by the minimum propagation gain base station selection unit 603 with the following formula (14). Note that the information of the calculated interference power $I_{test}$ is output to the first interference power judgment unit 605 as interference power information 1.

$$I_{test} = P^{MAX} G_j^{SP} \quad \text{Formula (14)}$$

The first interference power judgment unit 605 compares the interference power $I_{test}$ indicated in the interference power information 1 and current allowable interference power $I_{allow}$, and controls a destination to be connected of the switch unit 606 based on a result of the comparison. The first interference power judgment unit 605 causes the switch unit 606 to be connected to the maximum transmission power value allocation unit 607 as a next destination to output of a control instruction when the interference power $I_{test}$ is the allowable interference power $I_{allow}$ or less. Meanwhile, when the interference power $I_{test}$ exceeds the allowable interference power $I_{allow}$, the first interference power judgment unit 605 switches the switch unit 606 to be connected to the maximum propagation gain base station selection unit 609.

The maximum transmission power value allocation unit 607 allocates the allowable maximum transmission power value to the selected secondary base station and outputs a result thereof to the allowable interference power update unit 608.

The allowable interference power update unit 608 subtracts the interference power $I_{test}$ of a case where the allowable maximum transmission power value is allocated to the selected secondary base station from the allowable interference power $I_{allow}$, and outputs it to the minimum propagation gain base station selection unit 603 as new allowable interference power information $I_{allow}$.

The minimum propagation gain base station selection unit 603 selects a secondary base station having the minimum propagation gain from among the secondary base stations to be calculated (here, the secondary base stations except the secondary base station to which the allowable maximum transmission power value has been allocated, that is, the secondary base stations to which the transmission power has not been allocated).

Meanwhile, the maximum propagation gain base station selection unit 609, which is to operate when the interference power $I_{test}$ exceeds the allowable interference power $I_{allow}$, selects a secondary base station having the minimum propagation gain to the primary system terminal station 103-5 from among the secondary base stations to be calculated (the secondary base stations to which the transmission power has not been allocated) at this point. Then, the maximum propagation gain base station selection unit 609 outputs information of the selected secondary base station to the second interference power calculation unit 610 as second maximum propagation gain base station information.

The second interference power calculation unit 610 calculates interference power $I_{test}$ to the primary system terminal station when the necessary minimum transmission power value is allocated to the secondary base station selected by the maximum propagation gain base station selection unit 609 with the following formula (15). Note that information of the calculated interference power is output to the second interference power judgment unit 611 as interference power information 2.

$$I_{test} = P^{MIN} G_j^{SP} \quad \text{Formula (15)}$$

The second interference power judgment unit 611 compares the interference power $I_{test}$ indicated in the interference power information 2 and the current allowable interference power $I_{allow}$, and controls the destination to be connected of the switch unit 612 based on a result of the comparison.

The second interference power judgment unit 611 causes the switch unit 612 to be connected to the secondary use disapproval determination unit 613 as a next destination to output of a control instruction when the interference power $I_{test}$ exceeds the allowable interference power $I_{allow}$. Meanwhile, when the interference power $I_{test}$ is the allowable interference power $I_{allow}$ or less, the second interference power judgment unit 611 switches the switch unit 612 to be connected to the transmission power non-allocated base station transmission power calculation unit 614.

The secondary use disapproval determination unit 613 judges that the secondary use is not allowed with respect to the targeted secondary base station because the interference power is the allowable interference power or more even if the necessary minimum transmission power value is allocated to the targeted secondary base station. Then, the secondary use disapproval determination unit 613 excludes this secondary base station from the target to be allocated of the transmission power, and outputs a result thereof to the maximum propagation gain base station selection unit 609.

The maximum propagation gain base station selection unit 609 selects, as described above, a secondary base station having the maximum propagation gain from among the secondary base stations to which the transmission power has not been allocated (here, the secondary base stations except the secondary base station to which the transmission power value has been allocated and the secondary base station judged that the secondary use is not allowed).

The transmission power non-allocated base station transmission power calculation unit 614 calculates transmission power of the secondary base station to which the transmission power has not been allocated at this point, sums up a result thereof, and outputs it as transmission power calculation information.

Figure 9:
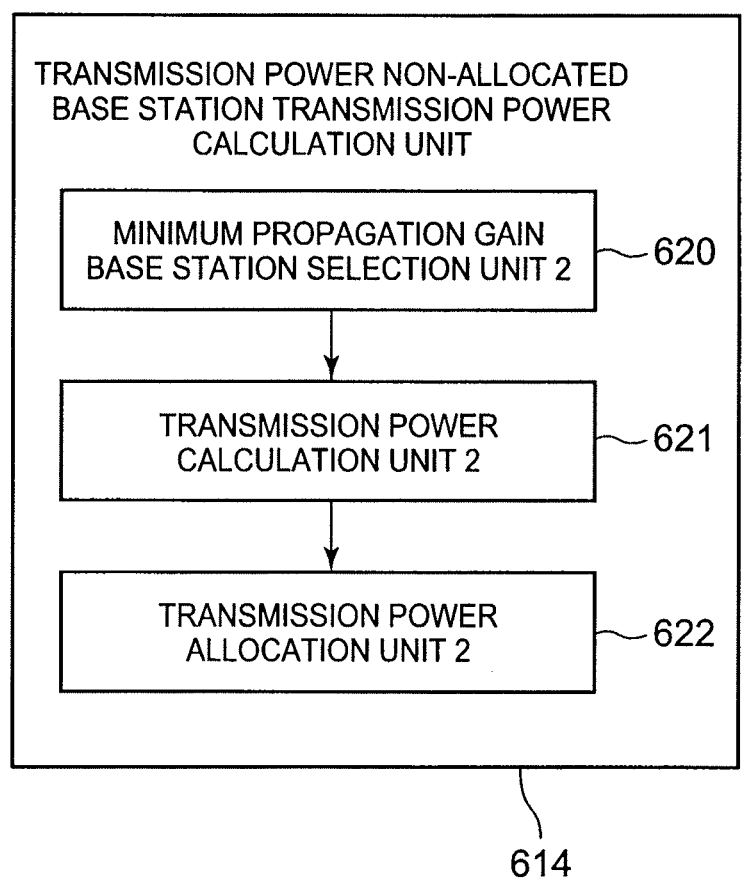
FIG. 9 It depicts a block diagram illustrating a configuration example of a transmission power calculation unit for a transmission power non-allocated base station of the second exemplary embodiment.

FIG. 9 is a block diagram illustrating a configuration example of the transmission power non-allocated base station transmission power calculation unit 614. The transmission power non-allocated base station transmission power calculation unit 614 illustrated in FIG. 9 includes a second minimum propagation gain base station selection unit 620, a second transmission power calculation unit 621, and a second transmission power allocation unit 622.

The second minimum propagation gain base station selection unit 620 selects a secondary base station having the minimum propagation gain to the primary system terminal station 103-5 from among the secondary base stations to which the transmission power has not been allocated at this point. Then, the second minimum propagation gain base station selection unit 620 outputs information of the selected secondary base station to the second transmission power calculation unit 621 as minimum propagation gain base station information 2.

The second transmission power calculation unit 621 calculates transmission power $P_j$ of the selected secondary base station using the propagation gain $G_j^{SP}$ of the selected secondary base station j to the primary system terminal station 103-5 and the current allowable interference power $I_{allow}$ based on the minimum propagation gain base station information 2. Also, the second transmission power calculation unit 621 outputs information of the calculated transmission power to the second transmission power allocation unit 622 as transmission power calculation information 2. The second transmission power calculation unit 621 calculates, for example, the transmission power $P_j$ of the selected secondary base station using the following formula (16).

[Math. 9]

$$P_j = \frac{I_{allow}}{G_j^{SP}} \quad \text{Formula (16)}$$

The second transmission power allocation unit 622 allocates the transmission power $P_j$ calculated in the second transmission power calculation unit 621 to the selected secondary base station j based on the transmission power calculation information 2. Also, the second transmission power allocation unit 622 judges that the secondary use is not allowed with respect to other secondary base stations that were not selected by the second minimum propagation gain base station selection unit 620 from among the secondary base stations to which the transmission power has not been allocated, and does not allocate the transmission power thereto.

Next, an operation of the present exemplary embodiment will be described. An operation of the radio control apparatus 50 according to the present exemplary embodiment is basically similar to the first exemplary embodiment illustrated in FIG. 6. However, the present exemplary embodiment differs from the first exemplary embodiment in that the secondary transmission power calculation step S108 is replaced with a secondary transmission power calculation step S108A.

Figure 10:
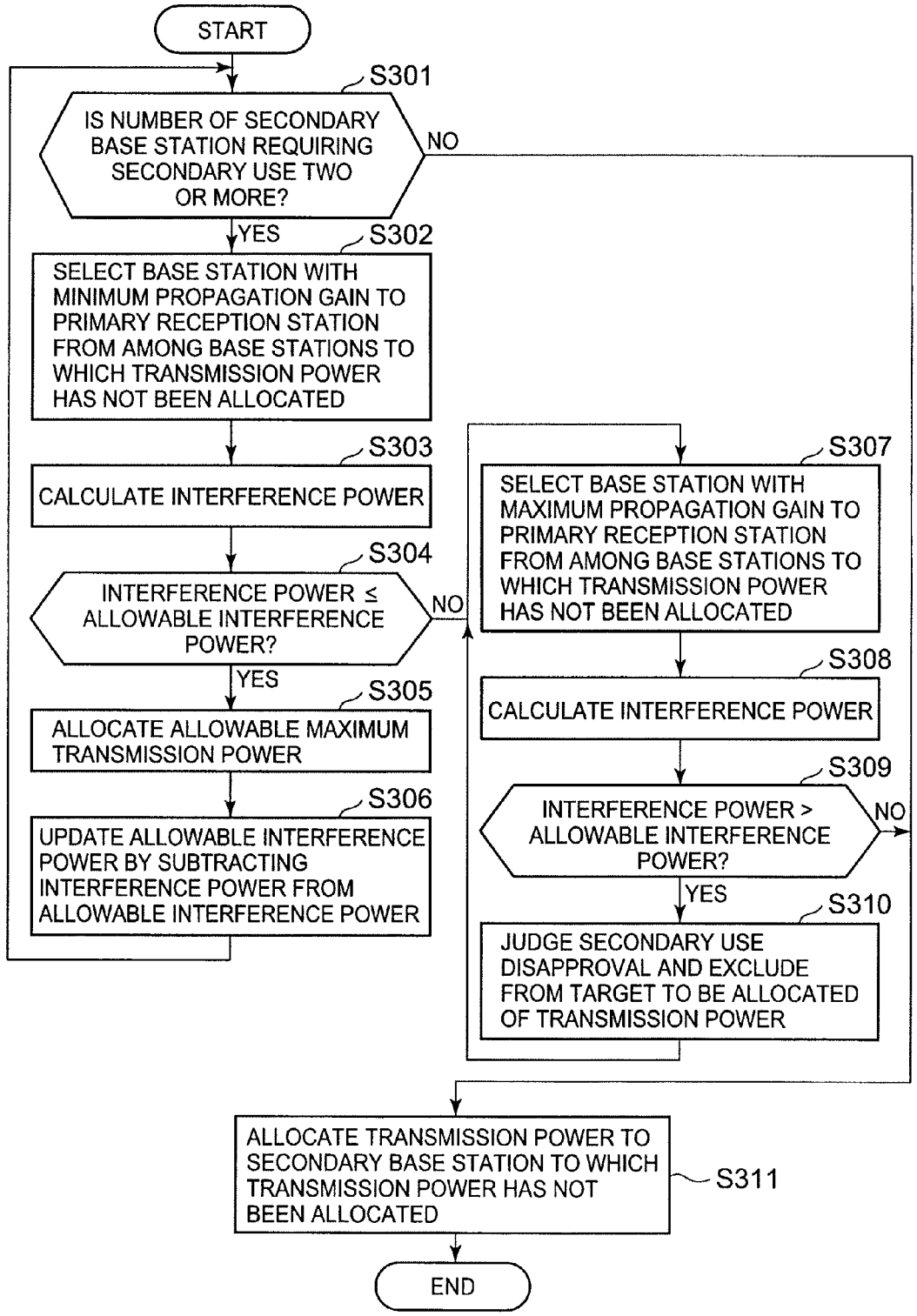
FIG. 10 It depicts a flowchart illustrating a more detailed example of a transmission power calculation operation in the second exemplary embodiment.

FIG. 10 is a flowchart illustrating an example of a more detailed operation of the secondary transmission power calculation step S108A in the present exemplary embodiment. As illustrated in FIG. 10, first, the secondary base station number judgment unit 601 judges the number of the secondary base stations that require the secondary use (step S301). The secondary base station number judgment unit 601 proceeds to step S302 when the number of the secondary base stations that require the secondary use is two or more, whereas the secondary base station number judgment unit 601 proceeds to step S311 when the number of the secondary base stations that require the secondary use is 1 or less.

In step S302, the minimum propagation gain base station selection unit 603 selects a base station having the minimum propagation gain to the primary system terminal station from among the base stations to which the transmission power has not been allocated at this point (at first, all of the secondary base stations that require the secondary use).

When one secondary base station is selected by the minimum propagation gain base station selection unit 603, the first interference power calculation unit 604 then calculates interference power to the primary system when the allowable maximum transmission power value is set to the selected secondary base station (step S303). Then, the first interference power judgment unit 605 compares the calculated interference power and the allowable interference power (step S304).

As a result of the comparison, when the interference power is the allowable interference power or less (Yes in step S304), the control switches to the maximum transmission power value allocation unit 607. The maximum transmission power value allocation unit 607 allocates the allowable maximum transmission power value to the selected secondary base station (step S305).

Next, the allowable interference power update unit 608 subtracts the interference power calculated in step S303 from the allowable interference power and updates the allowable interference power (step S306). After the allowable interference power is updated, the process returns to step S302, and a process of selecting the base station having the minimum propagation gain to the primary system terminal station is again performed by selecting from the base stations to which the transmission power has not been allocated at this point (in the second and subsequent processes, all of the secondary base stations except the secondary base stations to which the allowable maximum transmission power value has been allocated).

Meanwhile, in step S304, when it is judged that the interference power exceeds the allowable interference power (No in step S304), the control switches to the maximum propagation gain base station selection unit 609. The maximum propagation gain base station selection unit 609 selects the base station having the maximum propagation gain to the primary system terminal station from among the base stations to which the transmission power has not been allocated at this point (for example, all of the secondary base stations except the secondary base station to which the allowable maximum transmission power value has been allocated) (step S307).

When one secondary base station is selected by the maximum propagation gain base station selection unit 609, the second interference power calculation unit 610 then calculates interference power to the primary system when the necessary minimum transmission power value is set to the selected secondary base station (step S308). Next, the second interference power judgment unit 611 compares the interference power calculated by the second interference power calculation unit 610 and the allowable interference power, and performs judgment according to the interference power (step S309).

As a result of the comparison, when the interference power exceeds the allowable interference power (Yes in step S309), the control switches to the secondary use disapproval determination unit 613. The secondary use disapproval determination unit 613 judges that the secondary use is not allowed for the secondary base station and excludes the secondary base station from the target to be allocated of the transmission power (step S310). Then, when the base station to which the transmission capability has not been allocated still exists, the process returns to step S307, and a next secondary base station is selected. In step S307, the base station having the maximum propagation gain to the primary system terminal station is selected from among the base stations to which the transmission power has not been allocated at this point (in the second and subsequent process, all of the secondary base stations except the secondary base station to which the allowable maximum transmission power value has been allocated and the secondary base station judged that the secondary use is not allowed).

Meanwhile, when it is judged that the interference power is the allowable interference power or less in step S309 (No in step S309), the process proceeds to step S311.

In step S311, the transmission power non-allocated base station transmission power calculation unit 614 calculates transmission power of the secondary base station to which the transmission power has not been allocated at this point. In doing so, with respect to all of the secondary base stations that require the secondary use, either the transmission power is calculated or the secondary use is not allowed. Then, the transmission power non-allocated base station transmission power calculation unit 614 outputs information thereof (information indicating the secondary use disapproval or the transmission power with respect to each of the secondary base stations) as transmission power calculation information.

Note that the transmission power calculation method in the transmission power non-allocated base station transmission power calculation unit 614 is not limited to the above-described method. For example, a method described below may be applied.

That is, as another method of the transmission power determination method in the transmission power non-allocated base station transmission power calculation unit 614, the transmission power calculation method in the provisional transmission power calculation unit 520 illustrated in the first exemplary embodiment may be applied. To be specific, the above-described formula (7) or (8) is used.

Figure 11:
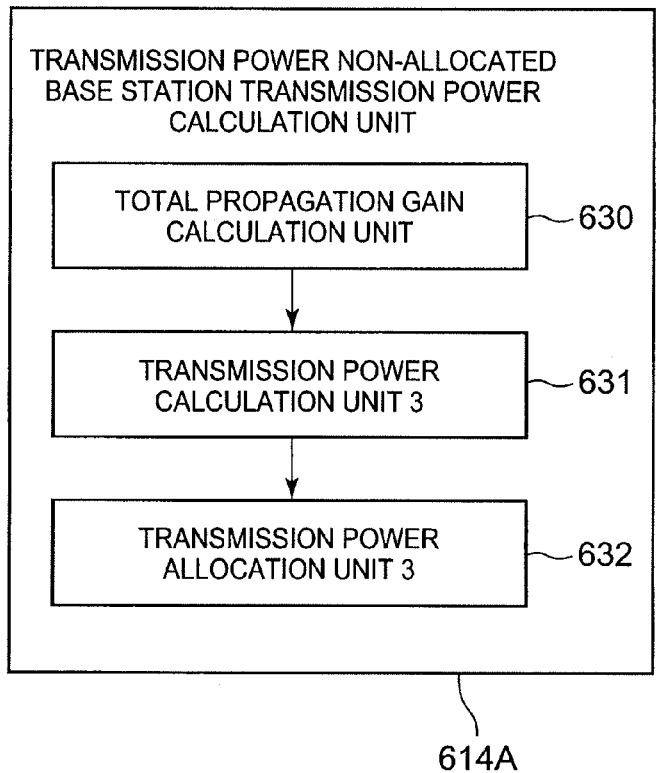
FIG. 11 It depicts a block diagram illustrating another configuration example of the transmission power calculation unit for a transmission power non-allocated base station of the second exemplary embodiment.

Further, as still another method, a method of equalizing the transmission power of the secondary base stations to which the transmission power has not been allocated may be applied. FIG. 11 is a block diagram illustrating another configuration example of the transmission power non-allocated base station transmission power calculation unit 614. The transmission power non-allocated base station transmission power calculation unit 614 (hereinafter, referred to as a transmission power non-allocated base station transmission power calculation unit 614A) illustrated in FIG. 11 includes a total propagation gain calculation unit 630, a third transmission power calculation unit 631, and a third transmission power allocation unit 632.

The total propagation gain calculation unit 630 transmission power calculates the sum of propagation gains of the secondary base station to which the transmission power has not been allocated to the primary system terminal station 107 (hereinafter, referred to as a total propagation gain), and outputs a result thereof to the third transmission power calculation unit 631 as total propagation gain information.

The third transmission power calculation unit 631 calculates transmission power P' to be allocated to the base station to which the transmission power has not been allocated using a total propagation gain indicated in the total propagation gain information and the allowable interference power information $I_{allow}$ with the following formula (17). The third transmission power calculation unit 631 outputs a result of the calculation to the third transmission power allocation unit 632 as transmission power calculation information 3.

[Math. 10]

$$P' = \frac{I_{allow}}{\sum_{i=1}^{M} G_i^{SP}}$$ 
Formula (17)

The third transmission power allocation unit 632 allocates the calculated transmission power value calculated in the third transmission power calculation unit 631 to all of the secondary base stations to which the transmission power has not been allocated based on the transmission power calculation information 3.

As described above, according to the present exemplary embodiment, in the secondary system 12 using the frequency band allocated to the primary system 11, or the preferential use thereof being allowed, the allowable maximum transmission power value is allocated in the order of descending propagation gain of the secondary base stations as long as the allowable value of the interference among given to the primary system 11 is satisfied. Therefore, a large transmission capacity can be secured for the secondary base station having a small propagation gain. Because the maximum value/minimum value of the secondary base station is also considered, the transmission power of the secondary base station can be properly set under a realistic constraint condition.

That is, the transmission power of each of the secondary base stations can be properly set in such a way that the allowable value of the interference amount given to the primary system 11 is satisfied and the transmission capacity of the secondary system is maximized.

Note that, in the above description, a method has been described in which the allowable maximum transmission power value is allocated by selecting the secondary base station in the order of having a smaller propagation gain to a larger propagation gain to the primary system terminal station. However, the present exemplary embodiment is not limited to the above method. For example, a method can be applied in which the allowable maximum transmission power value is allocated to the secondary base stations in the order of having a larger distance to a smaller distance with the primary system terminal station.

Also, before selecting the secondary base station having a small propagation gain to the primary system terminal station, it is possible that the interference power to the primary system of a case where the necessary minimum transmission power value is allocated to each of the secondary base stations is calculated in advance, and the secondary base station having the interference power that is the allowable interference power or more is excluded.

Also, in calculating the transmission power of each of the secondary base stations by the transmission power calculation unit 504A, on assumption that the allowable maximum transmission power value and the necessary minimum transmission power value are defined in the secondary base station, the transmission power of the secondary base station is caused to fall within the range of these values.

Meanwhile, when the allowable maximum transmission power value or the necessary minimum transmission power value is not defined in the secondary base station, related processes are not necessary. For example, when the allowable maximum transmission power value is not defined, regarding the configuration, the minimum propagation gain base station selection unit 603, the first interference power calculation unit 604, the first interference power judgment unit 605, the switch unit 606, the maximum transmission power value allocation unit 607, and the allowable interference power update unit 608 in the configuration example of the transmission power calculation unit 504A illustrated in FIG. 8 are not necessary. Also, regarding the operation, the process of steps S302 to S306 of the secondary transmission power calculation steps illustrated in FIG. 10 is not necessary. Meanwhile, when the necessary minimum transmission power value is not defined, regarding the configuration, the maximum propagation gain base station selection unit 609, the second interference power calculation unit 610, the second interference power judgment unit 611, the switch unit 612, and the secondary use disapproval determination unit 613 in the configuration example of the transmission power calculation unit 504 illustrated in FIG. 8 are not necessary. Also, regarding the operation, the process of steps S307 to S310 in the secondary transmission power calculation steps illustrated in FIG. 10 is not necessary.

Here, when both of the allowable maximum transmission power value and the necessary minimum transmission power value are not defined, regarding the configuration, the minimum propagation gain base station selection unit 603, the first interference power calculation unit 604, the first interference power judgment unit 605, the switch unit 606, the maximum transmission power value allocation unit 607, the allowable interference power update unit 608, the maximum propagation gain base station selection unit 609, the second interference power calculation unit 610, the second interference power judgment unit 611, the switch unit 612, and the secondary use disapproval determination unit 613 in the configuration example of the transmission power calculation unit 504A illustrated in FIG. 8 are not necessary. Also, regarding to the operation, the process of steps S302 to S310 in the secondary transmission power calculation steps illustrated in FIG. 10 is not necessary.

Further, in the present exemplary embodiment, modifications with regard to the first exemplary embodiment can be applied to the similar parts to the first exemplary embodiment. To be specific, a method in which a primary terminal station serves as an observation point in a mesh area, a method in which a primary terminal station expected to have large interference power from a secondary base station is selected in advance, a technique of limiting the primary reception station to one point, a processing method of a case where a secondary system is an up link, a method of a case where the secondary system is a separate system, and the like can be applicable.

Figure 12:
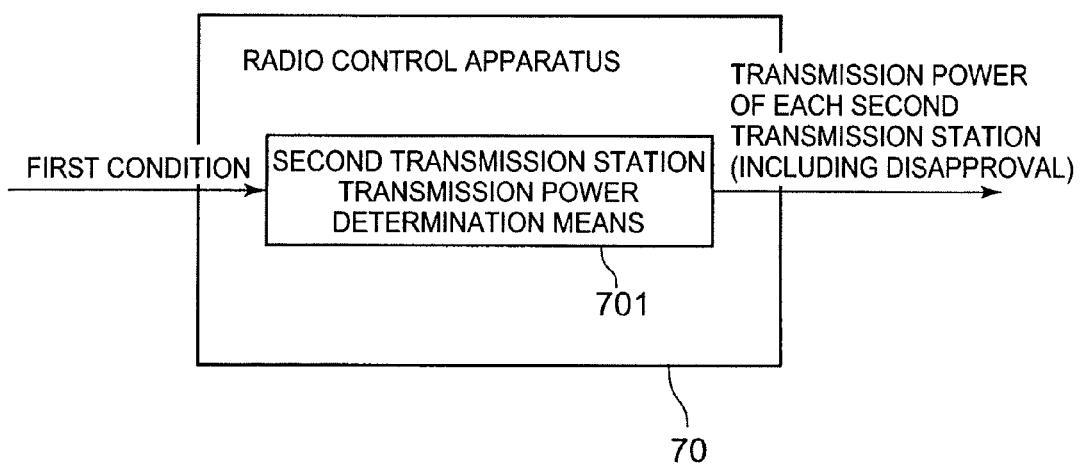
FIG. 12 It depicts a block diagram illustrating an outline of the present invention.

Next, an outline of the present invention will be described. FIG. 12 is a block diagram illustrating an outline of the present invention. A radio control apparatus 70 illustrated in FIG. 12 includes a second transmission station transmission power determination means 701.

The second transmission station transmission power determination means 701 determines the transmission power of each of the second transmission stations based on a first condition that satisfies the allowable value in relation to the system interference amount as the interference amount given to the first reception station that is a predetermined reception station of the first radio system by all of a plurality of second transmission stations that is the transmission station of the second radio system that uses the frequency band allocated to the first radio system or the frequency band, the preferential use thereof being allowed.

Note that the second transmission station transmission power determination means 701 is represented, in the above-described exemplary embodiment, by the allowable interference power calculation unit 503, the transmission power calculation unit 504 (or 504A), the other receiving point interference evaluation unit 505, the evaluation index calculation unit 506, and the transmission power determination unit 509.

Also, the second transmission station transmission power determination means 701 may determine the transmission power used in each of the second transmission stations based in the first condition and a second condition in relation to the transmission capacity of the second radio system.

Also, the second transmission station transmission power determination means 701 may determine the transmission power used in each of the second transmission station by further adding a third condition in relation to the transmission power of each of the second transmission stations.

Also, the second transmission station transmission power determination means 701 may include a provisional transmission power calculation means (for example, the provisional transmission power calculation unit 520) that calculates the provisional transmission power used in each of the second transmission stations using a calculation method developed by the first condition and the second condition, and a first correction means (for example, the maximum transmission power value judgment unit 521 and the maximum transmission power value allocation unit 523, or the minimum transmission power value judgment unit 527 and the secondary use disapproval determination unit 529) that corrects the provisional transmission power based on the third condition. In such a case, the transmission power corrected by the first correction means may be determined to be the transmission power used in the second transmission station.

According to such a configuration, the transmission power can be distributed to each of the second transmission stations in such a way that the transmission capacity of the second radio system is increased as much as possible while the condition of the interference amount given to the first reception station is satisfied.

Further, the first correction means may include a first allowable maximum transmission power allocation means (for example, the maximum transmission power value allocation unit 523) that allocates the allowable maximum transmission power to the second transmission station, the provisional transmission power thereof being the allowable maximum transmission power or more, and an interference amount allowable value update means (for example, the allowable interference power update unit 525) that subtracts the interference power given to the first reception station by the second transmission station to which the allowable maximum transmission power is allocated by the first allowable maximum transmission power allocation means from the allowable value of the system interference amount and determines it as a new allowable value where the third is the condition which condition determines the allowable maximum transmission power of each of the second transmission station.

According to such a configuration, the transmission power can be distributed to each of the second transmission stations in such a way that while the condition regarding the interference amount given to the first reception station is satisfied, the transmission capacity of the second radio system is increased as much as possible within the range not to exceed the allowable maximum transmission power of each of the second transmission stations.

Further, the first correction means may include a first propriety judgment means (for example, the minimum transmission power value judgment unit 527 and the secondary use disapproval determination unit 529) that performs judgment not to allow use of a frequency band with respect to the second transmission station that have the provisional transmission power being less than the necessary minimum transmission power where the third condition is the condition which determines the necessary minimum transmission power of each of the second transmission stations.

Further, as a formula developed by the first condition and the second condition, Formula (7) may be used where the provisional transmission power of the second transmission station j is $P_j'$, the allowable interference power is $I_{allow}$, the number of the transmission stations to be calculated is M', the propagation gain from the second transmission station j to the first reception station is $G_j^{SP}$.

Further, as a formula developed by the first condition and the second condition, Formula (8) may be used where the transmission power of the first transmission station of the first radio system is $P_p$, the propagation gain from the first transmission station to the second reception station contained in the second transmission station j is $G_j^{PS}$, the noise power in the second reception station is N, and the propagation gain from the second transmission station j to the second reception station contained therein is $G_j$ (with a bar).

Further, the second transmission station transmission power determination means 701 may calculate the transmission power of the second transmission station that satisfies the second condition by means of an optimization algorithm of numerical calculation where the first condition and the third condition are the constraint conditions.

Further, the second transmission station transmission power determination means 701 may include a second correction means (for example, the first interference power judgment unit 605 and the maximum transmission power value allocation unit 607, or the second interference power judgment unit 611 and the secondary use disapproval determination unit 613) that corrects the provisional transmission power of the second transmission station given by the third condition based on the first condition. In such a case, the transmission power corrected by the second correction means may be determined to be the transmission power used in the second transmission station.

According to such a configuration, the transmission power can be distributed to each of the second transmission stations while the condition of the interference amount given to the first reception station under the constraint condition regarding the transmission power of each of the second transmission stations.

Further, the second correction means may include a second allowable maximum transmission power allocation means (for example, the maximum transmission power value allocation unit 607) that allocates the allowable maximum transmission power to the second transmission station having the interference power given to the first reception station in a case where the allowable maximum transmission power given as the provisional transmission power is the allowable interference power or less, and an interference amount allowable value update means (for example, the allowable interference power update unit 608) that subtracting the interference power given to the first reception station by the second transmission station to which the allowable maximum transmission power is allocated by the second allowable maximum transmission power allocation means from the allowable value of the system interference amount to determine a new allowable value where the third condition is the condition which determines the allowable maximum transmission power of each of the second transmission stations.

According to such a configuration, the transmission power can be distributed to each of the second transmission stations while the condition of the interference amount given to the first reception station, and further the transmission capacity of the second radio system is increased as much as possible in a range not to exceed the allowable maximum transmission power of each of the second transmission stations.

Further, the second correction means may include a second propriety judgment means (for example, the second interference power judgment unit 611 and the secondary use disapproval determination unit 613) that performs judgment not to allow use of a frequency band with respect to the second transmission stations having the interference power given to the first reception station in a case where the allowable minimum transmission power is given as the provisional transmission power exceeding the allowable interference power where the third condition is the condition which determines the necessary minimum power of each of the second transmission stations.

According to such a configuration, the transmission power can be distributed to each of the second transmission stations in such a way that the transmission capacity of the second radio system is increased as much as possible under the realistic constraint condition in which the use of frequency band is not allowed for each of the second transmission stations that do not satisfy the condition of the necessary minimum power while the condition of the interference amount given to the first reception station is satisfied.

Also, the third condition may be determined based on the traffic of the second radio system or the position of the reception station.

As described above, although the present invention has been described with reference to the exemplary embodiment and examples, the present invention is not limited to the above-described exemplary embodiments and examples. Various modifications that a person skilled in the art can understand without departing from the scope of the invention can be made to the configurations and the details of the present invention.

This patent application claims the benefit of priority based on Japanese Patent Application No. 2010-139144 filed on Jun. 18, 2010, and incorporates herein all of the disclosure.

INDUSTRIAL APPLICABILITY

In a radio system that shares a frequency among different systems, the present invention can be favorably applied to a use of controlling transmission power of a plurality of second transmission stations as transmission stations of a secondary system.

REFERENCE SIGNS LIST

1 Radio system
11 First radio system (primary system)
12 Second radio system (secondary system)
21, 31 System band of the primary system
22, 32 System band of the secondary system
101 Primary system base station
102 Primary system coverage area
103-1 to 103-5 Terminal station of the primary system (primary terminal station)
104 Primary DB
201, 301, 401 Base station of the secondary system (secondary base station)
202 Coverage area of the secondary base station 201
302 Coverage area of the secondary base station 301
402 Coverage area of the secondary base station 401
203-1 to 203-2 Secondary terminal station contained in the secondary base station 201
303-1 to 303-2 Secondary terminal station contained in the secondary base station 301
403-1 to 403-2 Secondary terminal station contained in the secondary base station 401
50 Radio control apparatus
501 Primary information storage unit
502 Propagation gain calculation unit
503 Allowable interference power calculation unit
504, 504A Transmission power calculation unit
505 Other receiving point interference evaluation unit
506 Evaluation index calculation unit
507 Signal reception unit
508 Secondary information storage unit
509 Transmission power determination unit
510 Signal transmission unit
520 Provisional transmission power calculation unit
521 Maximum transmission power value judgment unit
522 Switch unit
523 Maximum transmission power value allocation unit
524 Interference power calculation unit
525 Allowable interference power update unit
526 Calculation target update unit
527 Minimum transmission power value judgment unit
528 Switch unit
529 Secondary use disapproval determination unit
530 Transmission power allocation unit
601 Secondary base station number judgment unit
602 Switch unit
603 Minimum propagation gain base station selection unit
604 First interference power calculation unit
605 First interference power judgment unit
606 Switch unit
607 Maximum transmission power value allocation unit
608 Allowable interference power update unit
609 Maximum propagation gain base station selection unit
610 Second interference power calculation unit
611 Second interference power judgment unit
612 Switch unit
613 Secondary use disapproval determination unit 614 Transmission power non-allocated base station transmission power calculation unit
620 Second minimum propagation gain base station selection unit
621 Second transmission power calculation unit
622 Second transmission power allocation unit
630 Total propagation gain calculation unit
631 Third transmission power calculation unit
632 Third transmission power allocation unit
70 Radio control apparatus
701 Second transmission station transmission power determination means

The invention claimed is:

1. A radio control apparatus for determining transmission power used in a plurality of second transmission stations as transmission stations of a second radio system using a frequency band allocated to a first radio system or a frequency band allowed to be preferentially used, the radio control apparatus comprising:
  a second transmission station transmission power determination unit configured to determine the transmission power used in each of the second transmission stations to satisfy a first condition which is defined as a system interference amount which is an interference amount given to a first reception station as a predetermined reception station of the first radio system by all of the second transmission stations is not more than an interference amount allowable in the first reception station.

2. The radio control apparatus according to claim 1, wherein the second transmission station transmission power determination unit determines the transmission power used in each of the second transmission stations to satisfy the first condition and to satisfy a second condition which is defined as a transmission capacity of the second radio system approaches a maximum value.

3. The radio control apparatus according to claim 1, wherein the second transmission station transmission power determination unit determines the transmission power used in each of the second transmission stations to satisfy a third condition which is defined as a maximum or a minimum transmission power of each of the second transmission stations.

4. The radio control apparatus according to claim 3, wherein the second transmission station transmission power determination unit includes:
  a provisional transmission power calculation unit configured to calculate provisional transmission power used in each of the second transmission stations using a formula developed by the first condition and the second condition; and
  a first correction unit configured to correct the provisional transmission power based on the third condition.

5. The radio control apparatus according to claim 4, wherein the third condition is the condition which determines allowable maximum transmission power of each of the second transmission stations, and
  the first correction unit includes:
    a first allowable maximum transmission power allocation unit configured to allocate the allowable maximum transmission power to the second transmission station in which the provisional transmission power is the allowable maximum transmission power or more; and
    an interference amount allowable value update unit configured to subtract interference power given to the first reception station by the second transmission station to which the allowable maximum transmission power is allocated from the allowable value of the system interference amount, and to determine an obtained value to be a new allowable value.

6. The radio control apparatus according to claim 4, wherein the third condition is the condition which determines necessary minimum transmission power of each of the second transmission stations, and
  the first correction unit includes a first propriety judgment unit configured to perform judgment not to allow use of the frequency band with respect to the second transmission station in which the provisional transmission power is less than the necessary minimum transmission power.

7. The radio control apparatus according to claim 4, wherein the formula is expressed by a following formula (A):

[Math. 11]

$$P'_i = \frac{I_{allow}}{M' G_j^{SP}} \quad \text{Formula (A)}$$

where the provisional transmission power of a second transmission station j is Pj', allowable interference power is $I_{allow}$, the number of transmission stations to be calculated is M', and a propagation gain from the second transmission station j to the first reception station is $G_j^{SP}$.

8. The radio control apparatus according to claim 4, wherein the formula is expressed by a following formula (B):

[Math. 12]

$$P'_j = \frac{I_{allow}}{M' G_j^{SP}} + \frac{(P_P G_j^{PS} + N)\left(\overline{G_j} \sum_{i=1}^{M'} \frac{G_i^{SP}}{\overline{G_i}} - M' G_j^{SP}\right)}{M' \overline{G_j} G_j^{SP}} \quad \text{Formula (B)}$$

where the transmission power of a first transmission station of the first radio system is $P_P$, a propagation gain from the first transmission station to a second reception station contained in the second transmission station j is $G_j^{PS}$, noise power in the second reception station is N, and a propagation gain from the second transmission station j to the second reception station contained in the second transmission station j is $G_j$ (with a bar).

9. The radio control apparatus according to claim 3, wherein the second transmission station transmission power determination unit calculates the transmission power of the second transmission station satisfying the second condition by an optimization algorithm of numerical calculation under the first condition and the third condition as constraint conditions.

10. The radio control apparatus according to claim 9, wherein the second transmission station transmission power determination unit includes a second correction unit configured to correct the provisional transmission power of the second transmission station given by the third condition, based on the first condition.

11. The radio control apparatus according to claim 10, wherein the third condition is the condition which determines the allowable maximum transmission power of each of the second transmission stations and the second correction unit includes:

a second allowable maximum transmission power allocation unit configured to allocate the allowable maximum transmission power to the second transmission station in which interference power given to the first reception station is less than the allowable interference power when the allowable maximum transmission power is given as the provisional transmission power; and an interference amount allowable value update unit configured to subtract the interference power given to the first reception station by the second transmission station to which the allowable maximum transmission power is allocated from the allowable value of the system interference amount, and to determine an obtained value to be a new allowable value.

12. The radio control apparatus according to claim 10, wherein the third condition is the condition which determines the necessary minimum power of each of the second transmission stations, and the second correction unit includes a second propriety judgment means configured to perform judgment unit not to allow use of the frequency band with respect to the second transmission station in which interference power given to the first reception station exceeds the allowable interference power when the necessary minimum transmission power is given as the provisional transmission power.

13. The radio control apparatus according to claim 3, wherein the third condition is determined based on traffic or a position of a reception station of the second radio system.

14. A radio system using a frequency band allocated to a first radio system or a frequency band allowed to be preferentially used, comprising:

a second transmission station transmission power determination unit configured to determine transmission power used in each of transmission stations to satisfy a first condition which is defined as a system interference which is an interference amount given to a first reception station as a predetermined reception station of the first radio system by all of the transmission stations requiring secondary use of the frequency band in the radio system is not more than an interference amount allowable in the first reception station.

15. A second transmission station transmission power determination method for determining transmission power used in a plurality of second transmission stations as transmission stations of a second radio system using a frequency band allocated to a first radio system or a frequency band allowed to be preferentially used, the method comprising:

determining the transmission power used in each of the second transmission stations to satisfy a first condition which is defined as a system interference amount which is an interference amount given to a first reception station as a predetermined reception station of the first radio system by all of the second transmission stations is not more than an interference amount allowable in the first reception station.

16. A non-transitory computer readable information recording medium storing a second transmission station transmission power determination program for determining transmission power used in a plurality of second transmission stations as transmission stations of a second radio system using a frequency band allocated to a first radio system or a frequency band allowed to be preferentially used, when executed by a processor, performs a method for:

determining the transmission power used in each of the second transmission stations to satisfy a first condition which is defined as a system interference amount which is an interference amount given to a first reception station as a predetermined reception station of the first radio system by all of the second transmission stations is not more than an interference amount allowable in the first reception station.

* * * * *

UNITED STATES PATENT AND TRADEMARK OFFICE
CERTIFICATE OF CORRECTION

PATENT NO. : 9,055,538 B2
APPLICATION NO. : 13/699381
DATED : June 9, 2015
INVENTOR(S) : Kenichirou Yamazaki et al.

It is certified that error appears in the above-identified patent and that said Letters Patent is hereby corrected as shown below:

ON THE TITLE PAGE

Column 1, Line 1: Delete "2001-139144" and insert -- 2010-139144 --

IN THE SPECIFICATION

Column 8, Line 64: Delete "$G_{hjl}^{SS}$" and insert -- $G_{hjk}^{SS}$ --

Column 16, Line 37: Delete "S5109" and insert -- S109 --

Signed and Sealed this
Twenty-ninth Day of December, 2015

Michelle K. Lee
*Director of the United States Patent and Trademark Office*